(12) United States Patent
Takahashi et al.

(10) Patent No.: US 8,386,139 B2
(45) Date of Patent: Feb. 26, 2013

(54) SHIFT CONTROL OF AUTOMATIC TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 401 days.

(21) Appl. No.: 12/836,172

(22) Filed: Jul. 14, 2010

(65) Prior Publication Data

US 2011/0015840 A1 Jan. 20, 2011

(30) Foreign Application Priority Data

Jul. 17, 2009 (JP) .................. 2009-169187
Jul. 9, 2010 (JP) .................. 2010-157222

(51) Int. Cl.
*G06F 7/00* (2006.01)
*G06F 17/00* (2006.01)
*G06F 19/00* (2006.01)

(52) U.S. Cl. .......................... 701/58; 701/51

(58) Field of Classification Search .................. None
See application file for complete search history.

(56) References Cited

U.S. PATENT DOCUMENTS

| | | | |
|---|---|---|---|
| 4,672,863 A | 6/1987 | Itoh et al. | |
| 4,674,359 A | 6/1987 | Hattori | |
| 4,793,217 A | 12/1988 | Morisawa et al. | |
| 5,207,122 A | 5/1993 | Minagawa | |
| 5,282,401 A | 2/1994 | Hebbale et al. | |
| 5,427,579 A | 6/1995 | Kanehara et al. | |
| 5,456,647 A | 10/1995 | Holbrook | |
| 5,468,198 A | 11/1995 | Holbrook et al. | |

(Continued)

FOREIGN PATENT DOCUMENTS

| | | |
|---|---|---|
| DE | 34 24 646 A1 | 2/1985 |
| DE | 100 51 692 A1 | 5/2001 |

(Continued)

OTHER PUBLICATIONS

R. Nonomura et al., US PTO Notice of Allowance, U.S. Appl. No. 12/828,604, dated Feb. 13, 2012, (17 pgs.).

(Continued)

*Primary Examiner* — Paul Danneman
(74) *Attorney, Agent, or Firm* — Foley & Lardner LLP

(57) ABSTRACT

A subtransmission mechanism 30 comprises a Ravigneaux planetary gear mechanism 31, a Low brake 32 and a High clutch 33, shifts between a first speed gear position in which the Low brake 32 is engaged whereas the High clutch 33 is disengaged and a second speed gear position in which the Low brake 32 is disengaged and the High clutch 33 is engaged. A minute slip is caused at the Low brake 32 and then terminated by engaging the High clutch 33. A value representing the engaging state variation such as an engaging time period and/or an engaging speed of the High clutch 33 is learned and the pressure of oil supplied during the engaging operation of the High clutch 33 is corrected based upon the learned value, thereby assuring a smooth shift operation by compensating for any inconsistency in the torque transmission characteristics of the High clutch 33.

12 Claims, 21 Drawing Sheets

U.S. PATENT DOCUMENTS

| | | | |
|---|---|---|---|
| 5,827,153 A | 10/1998 | Yasue et al. |
| 5,947,856 A | 9/1999 | Tabata et al. |
| 6,157,884 A | 12/2000 | Narita et al. |
| 6,295,497 B1 | 9/2001 | Kuras |
| 7,108,631 B2 | 9/2006 | Inoue et al. |
| 7,637,836 B2 | 12/2009 | Watanabe et al. |
| 7,780,570 B2 | 8/2010 | Iwatsuki et al. |
| 8,052,572 B2 | 11/2011 | Unno |
| 8,131,436 B2 | 3/2012 | Suzuki et al. |
| 8,187,145 B2 | 5/2012 | Kaminsky et al. |
| 8,204,659 B2 | 6/2012 | Kouno et al. |
| 8,214,093 B2 | 7/2012 | Heap et al. |
| 2006/0089775 A1 | 4/2006 | Whitton et al. |
| 2007/0129922 A1 | 6/2007 | Lee et al. |
| 2008/0020896 A1* | 1/2008 | Kamishima | 477/117 |
| 2008/0032861 A1 | 2/2008 | Maki et al. |
| 2008/0096721 A1 | 4/2008 | Honma et al. |
| 2009/0105041 A1 | 4/2009 | McKenzie et al. |
| 2009/0111650 A1 | 4/2009 | Jeon |
| 2010/0057316 A1 | 3/2010 | Tanaka et al. |
| 2010/0228412 A1 | 9/2010 | Sah |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |

OTHER PUBLICATIONS

U.S. Appl. No. 12/836,021, filed Jul. 14, 2010, Nonomura et al.
U.S. Appl. No. 12/836,099, filed Jul. 14, 2010, Takahashi et al.
U.S. Appl. No. 12/836,104, filed Jul. 14, 2010, Takahashi et al.
U.S. Appl.No. 12/836,128, filed Jul. 14, 2010, Takahashi et al.
U.S. Appl. No. 12/837,129, filed Jul. 15, 2010, Takahashi et al.
U.S. Appl. No. 12/837,133 filed Jul. 15, 2010, Takahashi et al.
U.S. Appl. No. 12/828,604, filed Jul. 1, 2010, Nonomura et al.
R. Nonomura et al., US PTO Notice of Allowance, U.S. Appl. No. 12/828,604, dated Jun. 7, 2012, (12 pgs.).
S. Takahashi et al., US PTO Notice of Allowance on U.S. Appl. No. 12/836,021 DTD Oct. 5, 2012, (45 pgs.).
S. Takahashi et al., US PTO Office Action on U.S. Appl. No. 12/836,099 DTD Sep. 18, 2012, (23 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/836,128 DTD Sep. 17, 2012, (50 pgs.).
S. Takahashi et al., US PTO Notice of Allowance on U.S. Appl. No. 12/837,129 DTD Oct. 11, 2012, (20 pgs.).

* cited by examiner 23a, 23b HYDRAULIC CYLINDER
31 RAVIGNEAUX PLANETARY
   GEAR MECHANISM
32 LOW BRAKE
33 HIGH CLUTCH
34 REV BRAKE 41 THROTTLE OPENING SENSOR
42 ROTATION SPEED SENSOR
43 VEHICLE SPEED SENSOR
45 INHIBITOR SWITCH

SHIFT CONTROL OF AUTOMATIC TRANSMISSION

FIELD OF THE INVENTION

This invention relates to shift control that may be executed for an automatic transmission equipped with frictional engagement elements such as a clutch and a brake.

BACKGROUND OF THE INVENTION

A gear-type automatic transmission used in an automobile selects a different motive power transmission path through which motive power is transmitted via gears and thus switches to one of a plurality of speed ratios by selectively engaging or disengaging a plurality of frictional engagement elements such as a clutch and a brake.

JP 2000-266173A issued by the Japan Patent Office in the year 2002 proposes that a shift shock or an internal combustion engine dynamic compression, which tend to occur as a frictional engagement element is engaged while disengaging another frictional engagement element, may be prevented by increasing the engaging oil pressure with a predetermined slope and, at the same time, reducing the disengaging oil pressure with a predetermined slope.

SUMMARY OF THE INVENTION

Due to a manufacturing error that may occur in production of the frictional engagement element or degradation of members constituting the frictional engagement element, the torque transmission start oil pressure at which the frictional engagement element starts to transmit torque as it is engaged does not necessarily match the design value. Likewise, the piston stroke length, measured as the frictional engagement element in a fully disengaged state, which is being driven with a piston to become engaged, enters a torque transmission starting state, does not always match the design value for similar reasons.

As a result, a shift shock or an internal combustion engine dynamic compression, attributable to the difference between the actual torque transmission characteristics of the frictional engagement element and the design characteristics, may occur.

It is therefore an object of this invention to assure smooth shift operation in a gear-type automatic transmission equipped with frictional engagement elements by compensating for inconsistency in the torque transmission characteristics.

In order to achieve the above object, this invention provides a control device for an automatic transmission for a vehicle. The transmission comprises a transmission mechanism that comprises a first frictional engagement element and a second frictional engagement element and is engaged in a shift operation between a first state in which the first frictional engagement element is disengaged and the second frictional engagement element is engaged and a second state in which the first frictional engagement element is engaged and the second frictional engagement element is disengaged.

The transmission mechanism has a characteristic that a minute slip is caused to occur at the second frictional engagement element by loosening engagement of the second frictional engagement element in the first state, and the minute slip is terminated as the first frictional engagement element is engaged.

The control device comprises a programmable controller programmed to perform a determination as to whether or not a shifting operation between the first state and the second state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order. When the determination is affirmative, the controller is further programmed to control the transmission mechanism to cause a minute slip at the second frictional engagement element by loosening engagement of the second frictional engagement element in the first state, terminate the minute slip at the second frictional engagement element by gradually engaging the first frictional engagement element, learn a value representing an engaging state variation in the first frictional engagement element between a time point at which engagement of the first frictional engagement element starts and a time point at which the minute slip of the second frictional engagement element is terminated, and correct an engaging force with which the first frictional engagement element is engaged in a shift operation executed to shift from the first state to the second state based upon the value representing the engaging state variation having been learned.

This invention also provides a control method for the automatic transmission for a vehicle comprising performing a determination as to whether or not a shifting operation between the first state and the second state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order, controlling the transmission mechanism, when the determination is affirmative, to cause a minute slip at the second frictional engagement element by loosening engagement of the second frictional engagement element in the first state, terminating the minute slip at the second frictional engagement element by gradually engaging the first frictional engagement element, learning a value representing an engaging state variation in the first frictional engagement element between a time point at which engagement of the first frictional engagement element starts and a time point at which the minute slip of the second frictional engagement element is terminated, and correcting an engaging force with which the first frictional engagement element is engaged in a shift operation executed to shift from the first state to the second state based upon the value representing the engaging state variation having been learned.

The details as well as other features and advantages of this invention are set forth in the remainder of the specification and are shown in the accompanying drawings.

DESCRIPTION OF THE PREFERRED EMBODIMENTS

In the following description, a "speed ratio" of a certain transmission mechanism is a value obtained by dividing an input rotation speed of a transmission mechanism by an output rotation speed of the transmission mechanism.

A "Lowest speed ratio" denotes a maximum speed ratio of the transmission mechanism, and a "Highest speed ratio" denotes a minimum speed ratio of the transmission mechanism.

Figure 1:
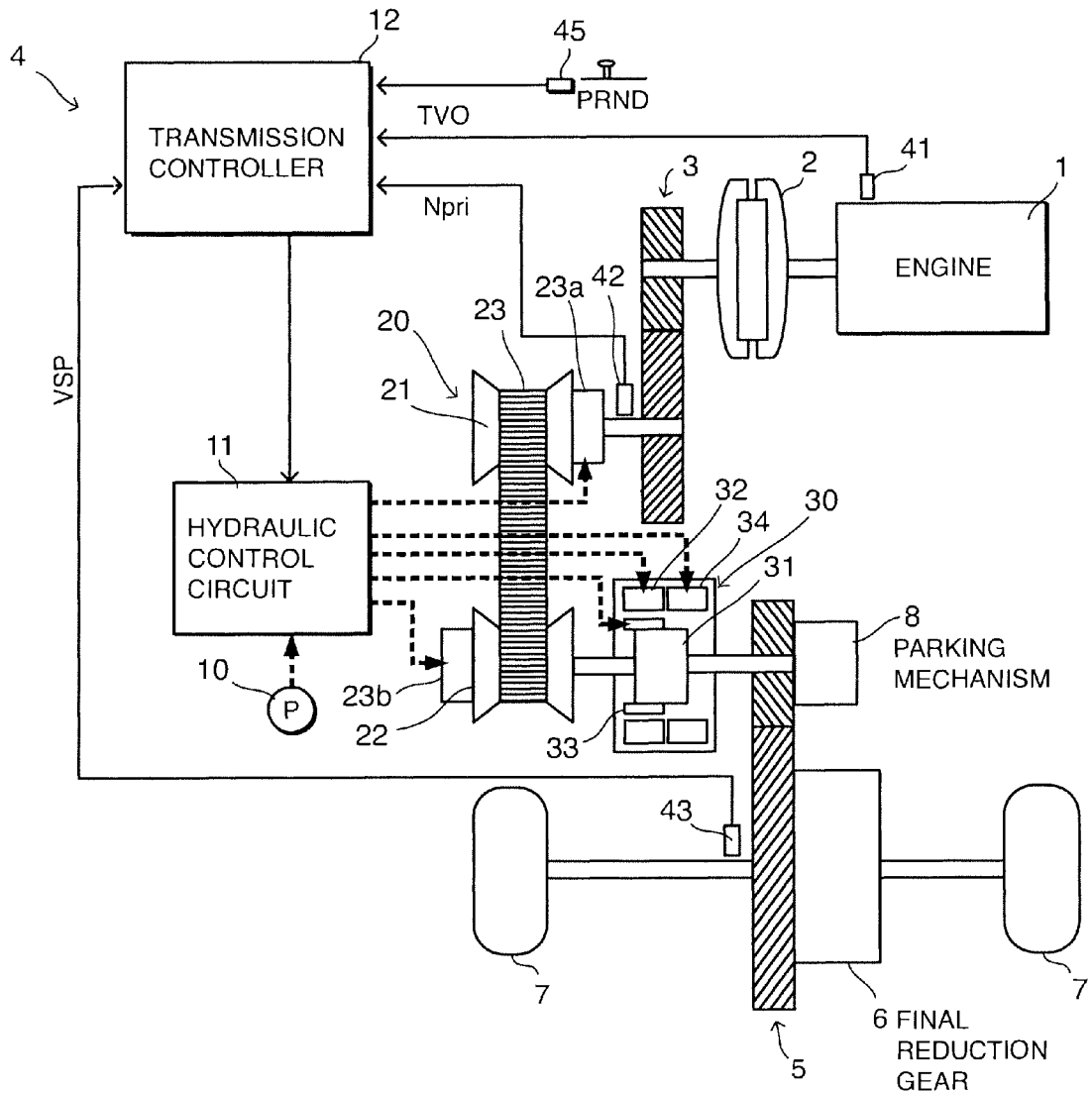
FIG. 1 is a schematic diagram showing the structure of a vehicle drive system equipped with a continuously variable transmission adopting this invention.

Referring to FIG. 1 of the drawings, a vehicle driving system including a continuously variable transmission 4 according to this invention comprises an internal combustion engine 1 as a power source. Output rotation of the internal combustion engine 1 is transmitted to drive wheels 7 via a torque converter having a lockup clutch 2, a first gear train 3, the continuously variable transmission 4, a second gear train 5, and a final reduction gear 6. The second gear train 5 is provided with a parking mechanism 8 which locks an output shaft of the continuously variable transmission 4 mechanically so that the output shaft is incapable of rotation during parking.

The continuously variable transmission 4 comprises a belt type continuously variable transmission mechanism (to be referred to as a "variator 20" hereafter), and a subtransmission mechanism 30 provided between the variator 20 and the second gear train 5.

The subtransmission mechanism 30 may be directly connected to an output shaft of the variator 20, as in this example, or via another transmission mechanism or power transmission mechanism, for example, a gear train.

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism.

The subtransmission mechanism 30 includes a Ravigneaux planetary gear mechanism 31 coupling the carriers of two planetary gear sets, and a plurality of frictional engagement elements, namely a Low brake 32, a High clutch 33, and a Reverse (Rev) brake 34, connected to a plurality of rotary elements constituting the Ravigneaux planetary gear mechanism 31 to modify the rotation states thereof.

The gear position of the subtransmission mechanism 30 is changed by adjusting the oil pressure supplied to the respective frictional engagement elements 32 to 34 such that the engagement/disengagement states of the respective frictional engagement elements 32 to 34 are modified.

For example, by engaging the Low brake 32 and disengaging the High clutch 33 and Rev brake 34, the gear position of the subtransmission mechanism 30 is set in a first speed.

By engaging the High clutch 33 and disengaging the Low brake 32 and Rev brake 34, the gear position of the subtransmission mechanism 30 is set in a second speed having a smaller speed ratio than the first speed.

By engaging the Rev brake 34 and disengaging the Low brake 32 and the High clutch 33, the gear position of the subtransmission mechanism 30 is set in reverse.

It should be noted that in the following description, a state in which the gear position of the subtransmission mechanism 30 is in the first speed will be expressed as "the continuously variable transmission 4 is in a low speed mode", and a state in which the gear position of the subtransmission mechanism 30 is in the second speed will be expressed as "the continuously variable transmission 4 is in a high speed mode".

In this embodiment, the variator 20 is constituted by a belt-type continuously variable transmission mechanism, but the variator 20 is not limited thereto. A chain-type continuously variable transmission mechanism in which a chain is sandwiched by pulleys, a toroidal continuously variable transmission mechanism including a full toroidal type and a half toroidal type, or any other type of continuously variable transmission mechanism may constitute the variator 20.

The continuously variable transmission 4 further comprises an oil pump 10 which is driven using a part of the power of the internal combustion engine 1, a hydraulic control circuit 11 which regulates an oil pressure from the oil pump 10 and supplies a regulated oil pressure to various sites of the continuously variable transmission 4, and a transmission controller 12 which controls the hydraulic control circuit 11.

Figure 2:
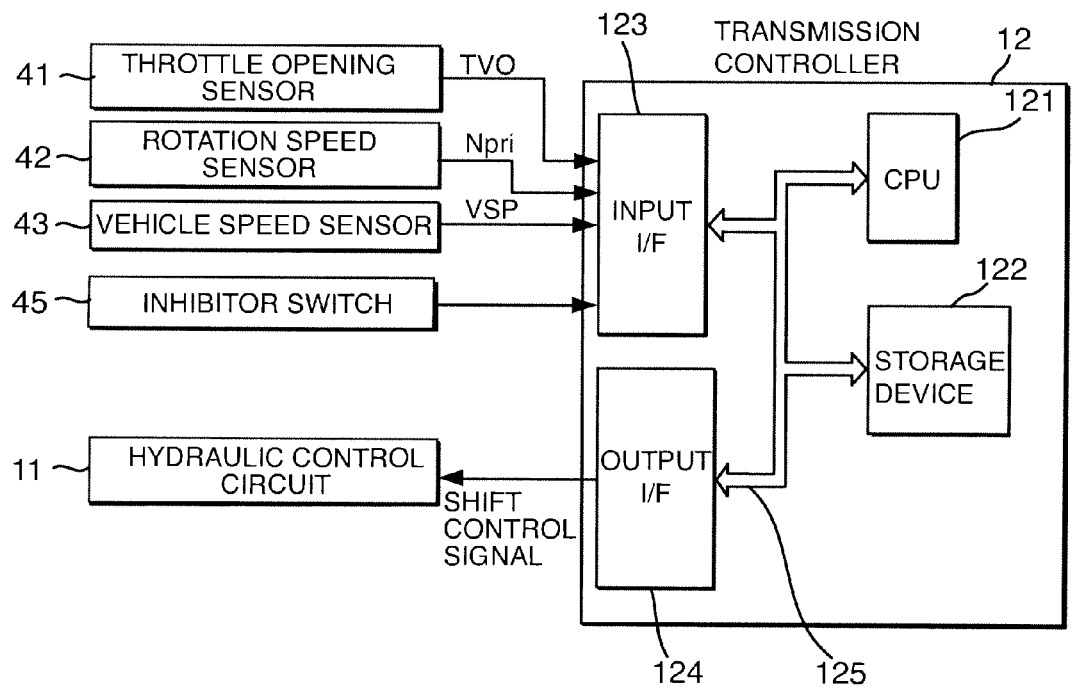
FIG. 2 is a block diagram showing the structure of a shift control device according to this invention.

Referring to FIG. 2, the transmission controller 12 is constituted by a CPU 121, a storage device 122 including a RAM and a ROM, an input interface 123, an output interface 124, and a bus 125 connecting these components to each other.

An output signal from a throttle opening sensor 41 that detects an opening of a throttle valve of the internal combustion engine 1 (to be referred to as a "throttle opening TVO" hereafter), an output signal from a rotation speed sensor 42 that detects an input rotation speed of the continuously variable transmission 4, which is equal to the rotation speed of the primary pulley 21 (to be referred to hereafter as a "primary rotation speed Npri"), an output signal from a vehicle speed sensor 43 that detects a traveling speed of the vehicle (to be referred to hereafter as a "vehicle speed VSP"), and an output signal from an inhibitor switch 45 that detects a position of a select lever with which the vehicle is provided are input into the input interface 123.

The storage device 122 stores a shift control program for the continuously variable transmission 4 and a shift map used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the continuously variable transmission 4. As a result, the speed ratio vRatio of the variator 20 is modified and the gear position of the subtransmission mechanism 30 is changed, whereby a shift is performed in the continuously variable transmission 4.

Figure 3:
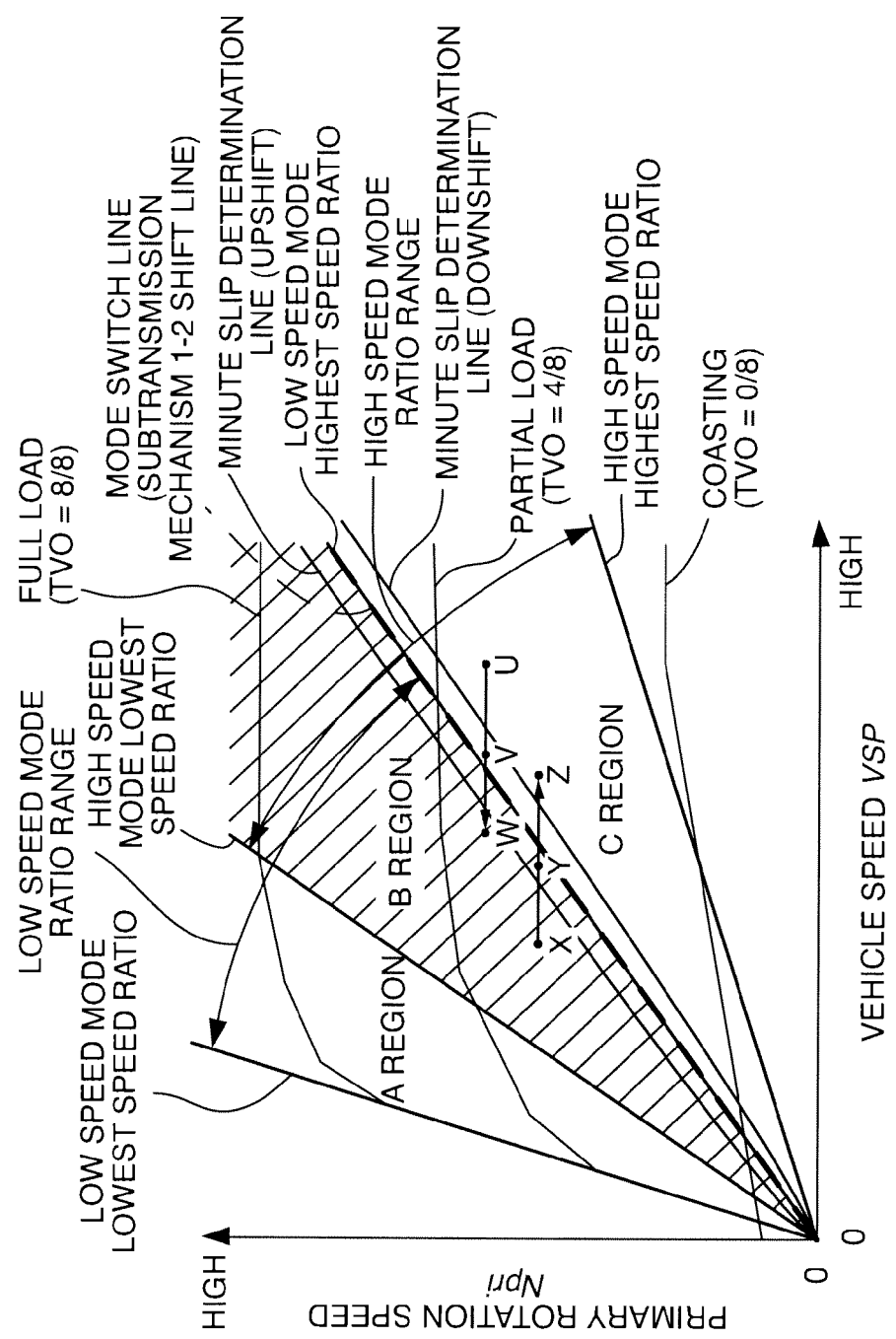
FIG. 3 is a diagram indicating the characteristics of a shift map pertaining to the continuously variable transmission stored in a transmission controller according to this invention.

Referring to FIG. 3, an example of the shift map stored in the storage device 122 of the transmission controller 12 will be described.

On the shift map, an operating point of the continuously variable transmission 4 is determined on the basis of the vehicle speed VSP and the primary rotation speed Npri.

An incline of a line linking the operating point of the continuously variable transmission 4 and a zero point in the lower left corner of the shift map indicates the speed ratio of the continuously variable transmission 4. The incline represents an overall speed ratio obtained by multiplying the speed ratio of the subtransmission mechanism 30 with the speed ratio vRatio of the variator 20, and is referred to hereafter as a "through speed ratio Ratio".

On this shift map, similarly to a shift map of a conventional belt type continuously variable transmission, a shift line is set at each throttle opening TVO, and a shift is performed in the continuously variable transmission 4 according to a shift line selected in accordance with the throttle opening TVO. For ease of understanding, FIG. 3 shows only a full load line used when the throttle opening TVO is 8/8, a partial load line used when the throttle opening TVO is 4/8, and a coasting line used when the throttle opening TVO is 0.

When the continuously variable transmission 4 is in the low speed mode, the continuously variable transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the continuously variable transmission 4 moves within an A region and a B region.

When the continuously variable transmission 4 is in the high speed mode, the continuously variable transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the continuously variable transmission 4 moves within the B region and a C region.

The speed ratios of the respective gear positions of the subtransmission mechanism 30 are set such that a speed ratio corresponding to the low speed mode Highest line representing a low speed mode Highest speed ratio is smaller than a speed ratio corresponding to the high speed mode Lowest line representing a high speed mode Lowest speed ratio.

In so doing, a low speed mode ratio range, which is the through speed ratio Ratio range of the continuously variable transmission 4 in the low speed mode, and a high speed mode ratio range, which is the through speed ratio Ratio range of the continuously variable transmission 4 in the high speed mode, partially overlap. As a result, when the operating point of the continuously variable transmission 4 is in the B region, which is sandwiched between the high speed mode Lowest line and the low speed mode Highest line, the continuously variable transmission 4 can select either the low speed mode or the high speed mode.

Further, on the shift map, a mode switch line on which a shift is performed in the subtransmission mechanism 30, i.e. a subtransmission mechanism 1-2 shift line in the diagram, is set to overlap the low speed mode Highest speed ratio. A through speed ratio corresponding to the mode switch line (to be referred to hereafter as a "mode switch speed ratio mRatio") is set at an equal value to the low speed mode Highest speed ratio.

When the operating point of the continuously variable transmission 4 crosses the mode switch line, or in other words when the through speed ratio Ratio of the continuously variable transmission 4 varies across the mode switch speed ratio mRatio, the transmission controller 12 performs mode switch control. In the mode switch control, the transmission controller 12 performs a shift in the subtransmission mechanism 30 and modifies the speed ratio vRatio of the variator 20 in an opposite direction to the variation direction of the speed ratio of the subtransmission mechanism 30.

More specifically, when the through speed ratio Ratio of the continuously variable transmission 4 shifts from being larger than the mode switch speed ratio mRatio to being smaller than the mode switch speed ratio mRatio, the transmission controller 12 changes the gear position of the subtransmission mechanism 30 from the first speed to the second speed and modifies the speed ratio vRatio of the variator 20 to the large speed ratio side.

Conversely, when the through speed ratio Ratio of the continuously variable transmission 4 shifts from being smaller than the mode switch speed ratio mRatio to being larger than the mode switch speed ratio mRatio, the transmission controller 12 changes the gear position of the subtransmission mechanism 30 from the second speed to the first speed and modifies the speed ratio vRatio of the variator 20 to the small speed ratio side.

During a mode switch, the speed ratio vRatio of the variator 20 is varied in an opposite direction to the speed ratio variation of the subtransmission mechanism 30 in order to suppress an unpleasant feeling experienced by a driver or passenger of the vehicle due to input rotation variation generated by a sudden change in the through speed ratio Ratio of the continuously variable transmission 4.

Causing the speed ratio of the variator 20 to vary in an opposite direction to the varying direction of the speed ratio of the subtransmission mechanism 30 to suppress a variation in the through speed ratio Ratio in this way is referred to as a cooperative speed change.

Referring to FIGS. 4A-4G, standard mode switch shift control for a cooperative speed change, executed when the continuously variable transmission 4 in the low-speed mode is switched to the high speed mode, is described. The dotted line and the solid line in FIG. 4F respectively indicate a control command value and an actual oil pressure.

The rotation speed Npri of the primary pulley 21 in the continuously variable transmission 4 and the engine rotation speed Ne at the internal combustion engine 1 may be considered equal to each other when the torque converter 2 is in a locked-up state. Accordingly, the following description is given by assuming that the input rotation speed at the continuously variable transmission 4 matches the engine rotation speed Ne.

The timing chart in FIGS. 4A-4G relates to mode switch shift processing that may be executed as a shift line, selected in correspondence to the throttle opening TVO, moves from the B region to the C region across the mode switch line in a shift map assuming the characteristics shown in FIG. 3. The shift control of the continuously variable transmission 4 comprises four phases, namely a preparatory phase, a torque phase, an inertia phase, and a terminal phase. Actual variation in the speed ratio of the continuously variable transmission 4 takes place in the inertia phase. In the torque phase that precedes the inertia phase, the oil pressure supplied to the Low brake 32 and the oil pressure supplied to the High clutch 33 are varied but the speed ratio does not vary. In the preparatory phase that precedes the torque phase, preparatory oil pressure control of the Low brake 32 and High clutch 33 that is required before starting the torque phase is performed. In the terminal phase that follows the inertia phase, the oil pressure in the Low brake 32 and High clutch 33 is finally adjusted to specified oil pressure levels, respectively.

After determining, based upon the current vehicle state, that the gear position at the subtransmission mechanism 30 is to shift from the first speed to the second speed, the transmission controller 12 starts the preparatory phase at a time point t0 to prepare for engagement of the High clutch 33 and disengage the Low brake 32.

Figure 4:
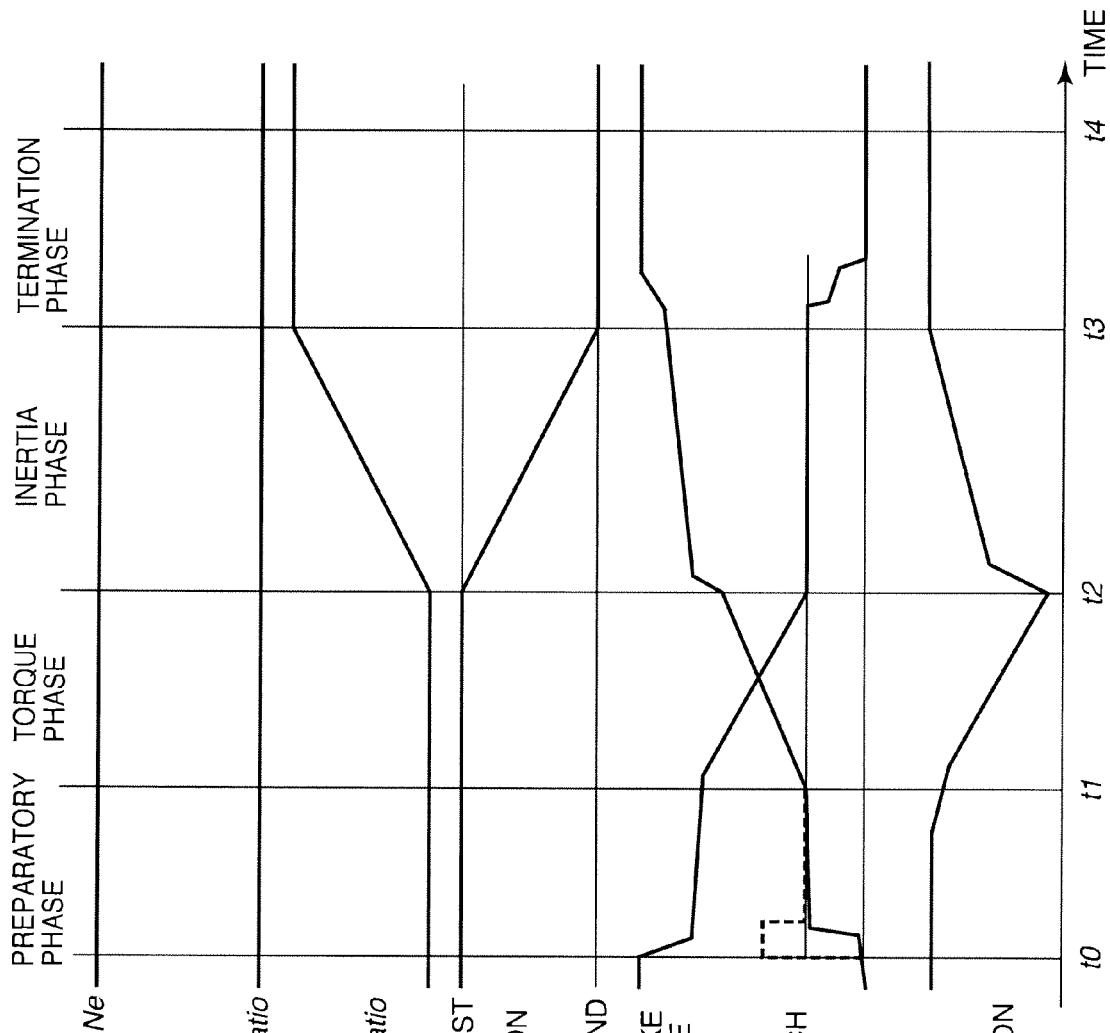
FIGS. 4A-4G are a timing chart of a typical mode switch operation for cooperative speed change.

In the preparatory phase, the transmission controller 12 first executes a precharge operation to temporarily increase the oil pressure at the High clutch 33, then adjusts the oil pressure to a predetermined preparatory-phase oil pressure and waits in standby, as indicated by the dotted line in FIG. 4F. In addition, the oil pressure at the Low brake 32 is adjusted to a predetermined preparatory-phase oil pressure before entering the standby state, as shown in FIG. 4E.

In the torque phase which starts at a time point t1, the transmission controller 12 gradually increases the oil pressure at the High clutch 33 from the preparatory-phase oil pressure, as shown in FIG. 4F, and also gradually decreases the oil pressure at the Low brake 32 from the preparatory-phase oil pressure, as indicated in FIG. 4E. However, the extents to which the oil pressure at the High clutch 33 and the oil pressure at the Low brake 32 change during the torque phase are not enough to cause a shift in the gear position at the subtransmission mechanism 30 and thus, the first speed gear position is sustained at the subtransmission mechanism 30 during the torque phase. The oil pressure levels to be achieved at the High clutch 33 and the Low brake 32 at the end of the torque phase are set in advance so as to ensure that the speed ratio at the subtransmission mechanism 30 starts to change at the time point t2, to enable a shift from the first speed to the second speed.

During the inertia phase starting at the time point t2, the transmission controller 12 slightly increases the oil pressure at the High clutch 33 so as to ensure that the oil pressure at the High clutch 33 is maintained at a higher level than the oil pressure assumed at the end of the torque phase, as indicated in FIG. 4F, and also sustains the oil pressure at the Low brake 32 at the oil pressure level assumed at the end of the torque phase, as indicated in FIG. 4E.

With the oil pressure thereat held as described above, the High clutch 33 gradually engages. With the oil pressure thereat held as described above, the Low brake 32 gradually disengages. As a result, the subtransmission mechanism 30 gradually shifts from the first speed gear position to the second speed gear position, as indicated in FIG. 4D.

In correspondence to the shift operation underway at the subtransmission mechanism 30, the transmission controller 12 gradually increases the speed ratio vRatio at the variator 20 along a direction opposite from the direction in which the speed ratio at the subtransmission mechanism 30 changes, as indicated in FIG. 4C.

More specifically, the transmission controller 12 adjusts the pressures of the oil supplied to the hydraulic cylinders 23a and 23b so as to individually alter the widths of the V grooves at the pulleys 21 and 22, thereby gradually increasing the speed ratio vRatio at the variator 20.

Through this process, the transmission controller 12 ensures that the through speed ratio Ratio remains unchanged by achieving a cooperative speed change during which the speed ratio at the variator 20 is controlled so that it changes along the direction opposite from the direction in which the shift at the subtransmission mechanism 30 occurs.

The shift from the first speed to the second speed at the subtransmission mechanism 30 is completed at a time point t3.

During the terminal phase starting at the time point t3, the transmission controller 12 increases the oil pressure at the High clutch 33 to a specified oil pressure level, thereby fully engaging the High clutch 33. At the same time, the transmission controller 12 drains the oil pressure from the Low brake 32, thereby fully disengaging the Low brake 32.

At a time point t4, the transmission controller 12 completes the sequence of the processing described above and thus, the shift from the first speed to the second speed at the subtransmission mechanism 30 ends.

The Low brake 32, the High clutch 33 and the Rev brake 34 in the subtransmission mechanism 30 each includes a frictional engagement element 300 that hydraulically engages or disengages.

Figure 5:
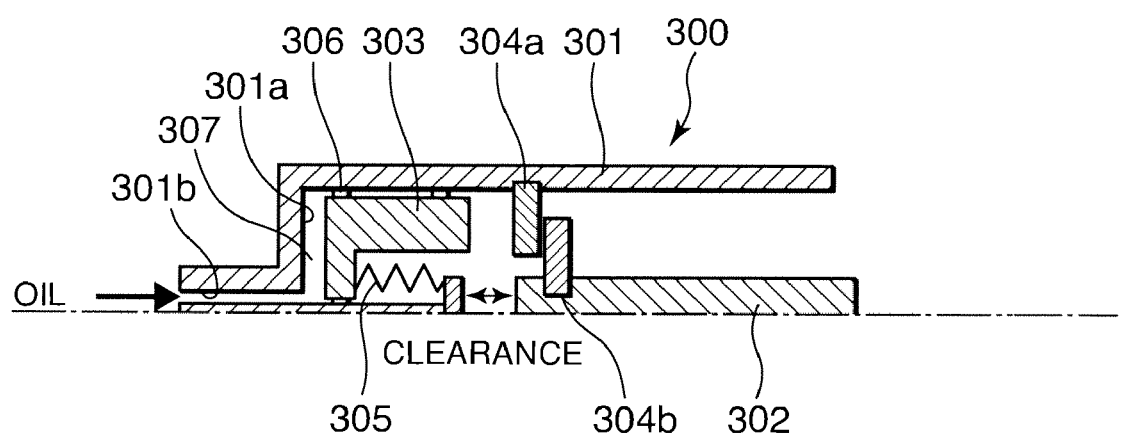
FIG. 5 is a longitudinal sectional view of a frictional engagement element that the continuously variable transmission comprises.

Referring to FIG. 5, the structure of the frictional engagement element 300 is described.

The frictional engagement element 300 includes an output shaft 302 coaxially mounted further inward relative to an input shaft 301 assuming the shape of a tube with a solid bottom. A ring-shaped friction transmitting portion 304a is attached at the inner circumference of the input shaft 301. The friction transmitting portion 304a is attached to the input shaft 301 so that it rotates as one with the input shaft 301 and that it can be displaced relative to the input shaft 301 over a slight range along the axial direction. A disk-shaped friction transmitting portion 304b is fixed onto the outer circumference of the output shaft 302 so as to face opposite the friction transmitting portion 304a along the axial direction.

Between a bottom surface 301a of the input shaft 301, located on the inner side of the input shaft 301, and the friction transmitting portion 304a, a cylinder 303 is mounted so that it can be displaced along the axial direction. An oil chamber 307 is formed on the inner side of the input shaft 301, between the cylinder 303 and the bottom surface 301a of the input shaft 301. A hydraulic passage 301b, through which a hydraulic fluid is supplied to the oil chamber 307 and the hydraulic fluid from the oil chamber 307 is discharged, passes through the bottom surface 301a.

The front end of the cylinder 303, located on the side opposite from the oil chamber 307, faces opposite the friction transmitting portion 304a. The cylinder 303 is elastically supported by a return spring 305 along a direction running against the oil pressure at the oil chamber 304 in relation to the axial direction. When the oil chamber 307 is in a low pressure state, a specific clearance is maintained via the return spring 305 between the front end of the cylinder 303 and the friction transmitting portion 304a.

As pressurized hydraulic fluid is supplied via the hydraulic passage 301b to the oil chamber 307, the cylinder 303 is displaced against the force imparted by the return spring 305, along the direction in which the clearance is narrowed, i.e., to the right side along the axial direction in the figure, until its front end comes into contact with the friction transmitting portion 304a, which is then displaced along the axial direction and is pressed against the friction transmitting portion 304b.

As the friction transmitting portion 304a comes into contact with the friction transmitting portion 304b as described above, a torque is transmitted between the friction transmitting portion 304a and the friction transmitting portion 304b in proportion to the level of the contact pressure between them.

The oil pressure at the oil chamber 307, with which the friction transmitting portion 304a is pressed against the friction transmitting portion 304b, acts as an engaging force that engages the friction transmitting portion 304a with the friction transmitting portion 304b. Accordingly, the engaging force with which the friction transmitting portion 304a and the friction transmitting portion 304b are engaged with each other or the torque transmission capacity between the friction transmitting portions 304a and 304b can be adjusted by controlling the oil pressure at the oil chamber 307.

When the oil chamber 307 is in a low pressure state, the cylinder 303 is held at a retreat position, i.e., set back to the left in the figure, with the elastic force imparted by the return spring 305 and thus, a specific clearance is formed between the front end of the cylinder 303 and the friction transmitting portion 304a.

During the preparatory phase preceding the actual engagement of the frictional engagement element 300, pressurized hydraulic fluid is supplied via the hydraulic passage 301b to the oil chamber 307 to allow the cylinder 303 to start moving simultaneously as the operation enters the torque phase. However, even if the cylinder 303 starts to move with the timing of the start of the torque phase, the length of time elapsing before the front end of the cylinder 303 comes into contact with the friction transmitting portion 304a causes a response delay in relation to the engagement of the friction transmitting portion 304a and the friction transmitting portion 304b due to the presence of the clearance.

In order to minimize the extent of this response delay, the transmission controller 12 outputs a command signal to the hydraulic control circuit 11 so as to temporarily supply a precharge oil pressure, higher than the oil pressure assumed that the torque phase start, to the oil chamber 307 at the beginning of the preparatory phase. This operation is equivalent to the precharge operation mentioned earlier. By executing the precharge operation, the extent of the response delay in relation to the engagement of the friction transmitting portion 304a and the friction transmitting portion 304b can be reduced.

The torque transmission start oil pressure at the frictional engagement element 300 may not match the design value due to manufacturing error pertaining to components thereof such as the cylinder 303 and the friction transmitting portions 304a and 304b or wear attributable to degradation occurring over time.

Referring to FIGS. 6A-6D, FIGS. 7A-7D, FIGS. 8A-8D and FIGS. 9A-9D, adverse effects of inconsistency in the torque transmission start oil pressure are described.

FIGS. 6A-6D pertain to a situation in which the actual torque transmission start oil pressure at the frictional engagement element 300 in the High clutch 33 is less than the torque transmission start oil pressure supplied by the hydraulic control circuit 11. The dotted line in FIG. 6C indicates the value set for the torque transmission start oil pressure to be supplied by the hydraulic control circuit 11, whereas the solid line in FIG. 6C indicates the real value of the torque transmission start oil pressure.

Figure 6:
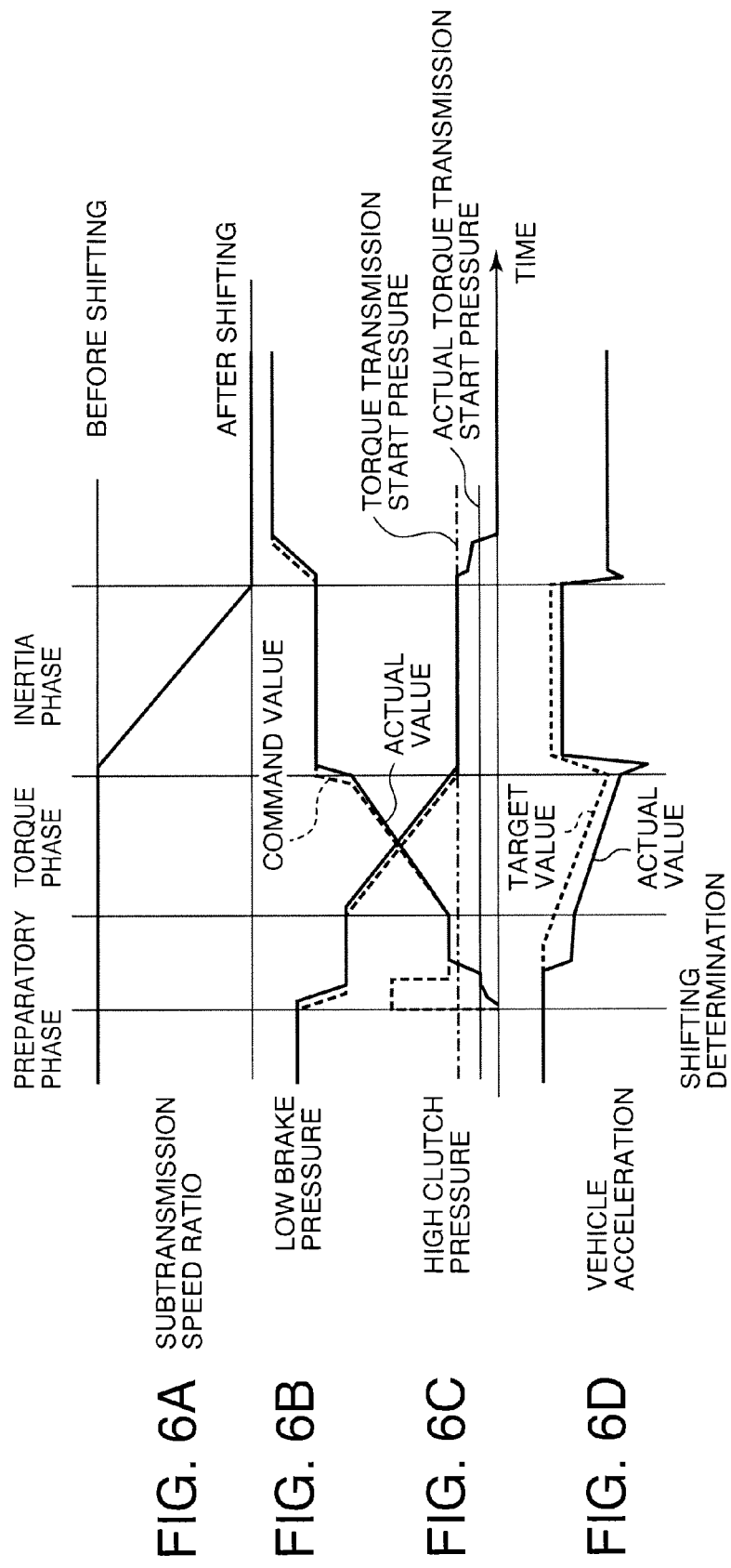
FIGS. 6A-6D are a timing chart of a shift operation that may be executed in the continuously variable transmission when the torque transmission start oil pressure is lower than the design pressure on an occasion when shift control according to this invention is not applied.
Figure 7:
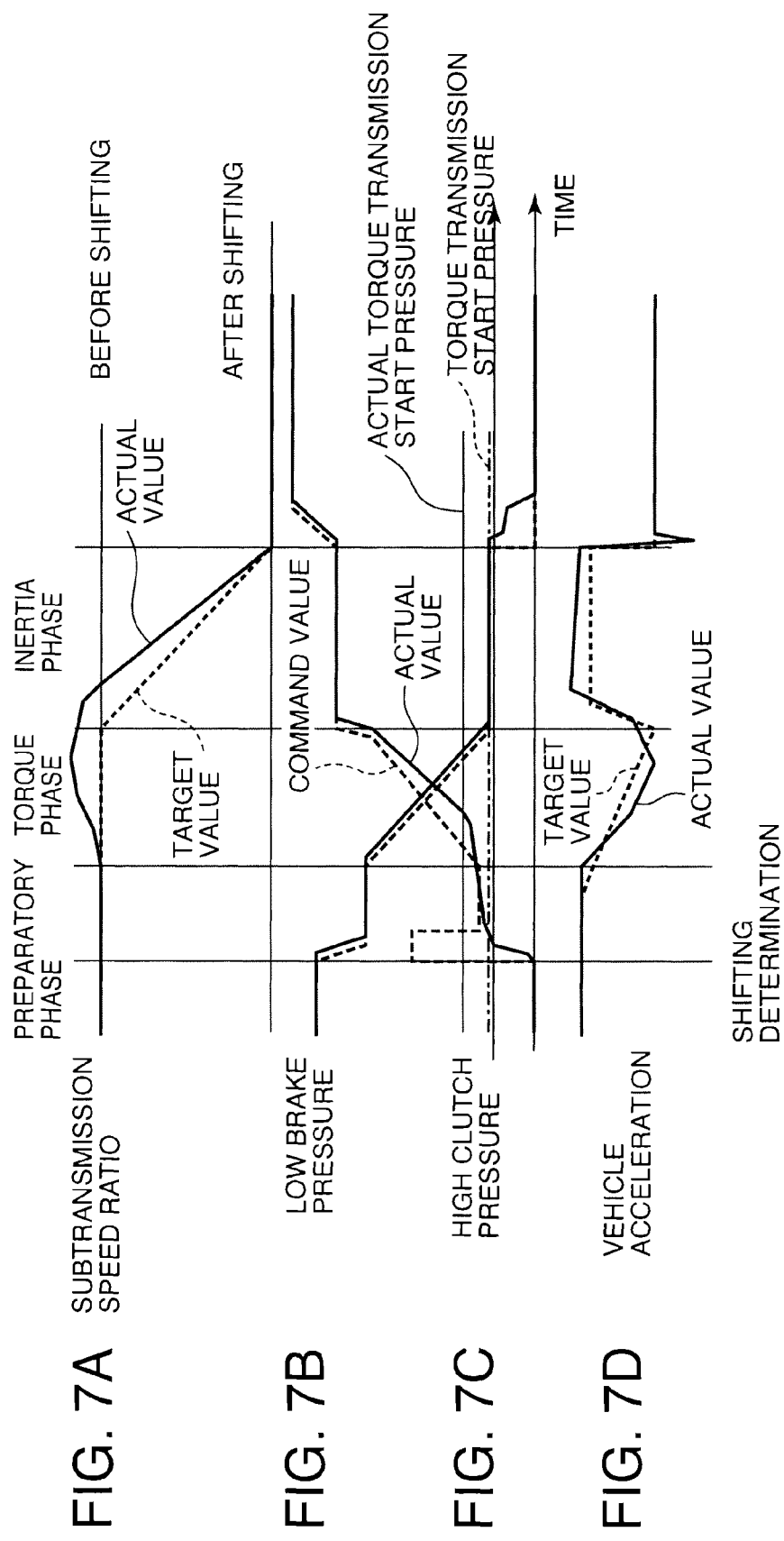
FIGS. 7A-7D are a timing chart of a shift operation hat may be executed in the continuously variable transmission when the torque transmission start oil pressure is higher than the design pressure on an occasion when shift control according to this invention is not applied.

In this situation, an excessive engaging force is imparted and, as a result, the actual torque transmission starts sooner than it should. Consequently, a reduction in the vehicle acceleration occurs during the preparatory phase as indicated in FIG. 6D. Such a reduction in the vehicle acceleration occurring in the preparatory phase may cause discomfort to the driver or a shift shock.

FIGS. 7A-7D pertain to a situation in which the actual torque transmission start oil pressure at the frictional engagement element 300 in the High clutch 33 is more than the torque transmission start oil pressure supplied by the hydraulic control circuit 11. The dotted line in FIG. 7C indicates the value set for the torque transmission start oil pressure to be supplied by the hydraulic control circuit 11, whereas the solid line in FIG. 7C indicates the real value of the torque transmission start oil pressure.

In this situation, since a sufficient oil pressure for engaging the engagement element is not supplied, the stroke of the cylinder 303 is not completed during the preparatory phase.

If the operation enters the torque phase without completing the cylinder stroke, the friction transmitting portions 304a and 304b will slide without resistance and thus, no torque will be transmitted during an initial period of the torque phase. This, in turn, may lead to an abrupt increase in the engine rotation speed or a shift shock.

FIGS. 8A-8D pertain to a situation in which the stroke length at the actual torque transmission start at the frictional engagement element 300 in the High clutch 33 is less than the stroke length of the cylinder 303 attributable to the precharge oil pressure supplied by the hydraulic control circuit 11.

Figure 8:
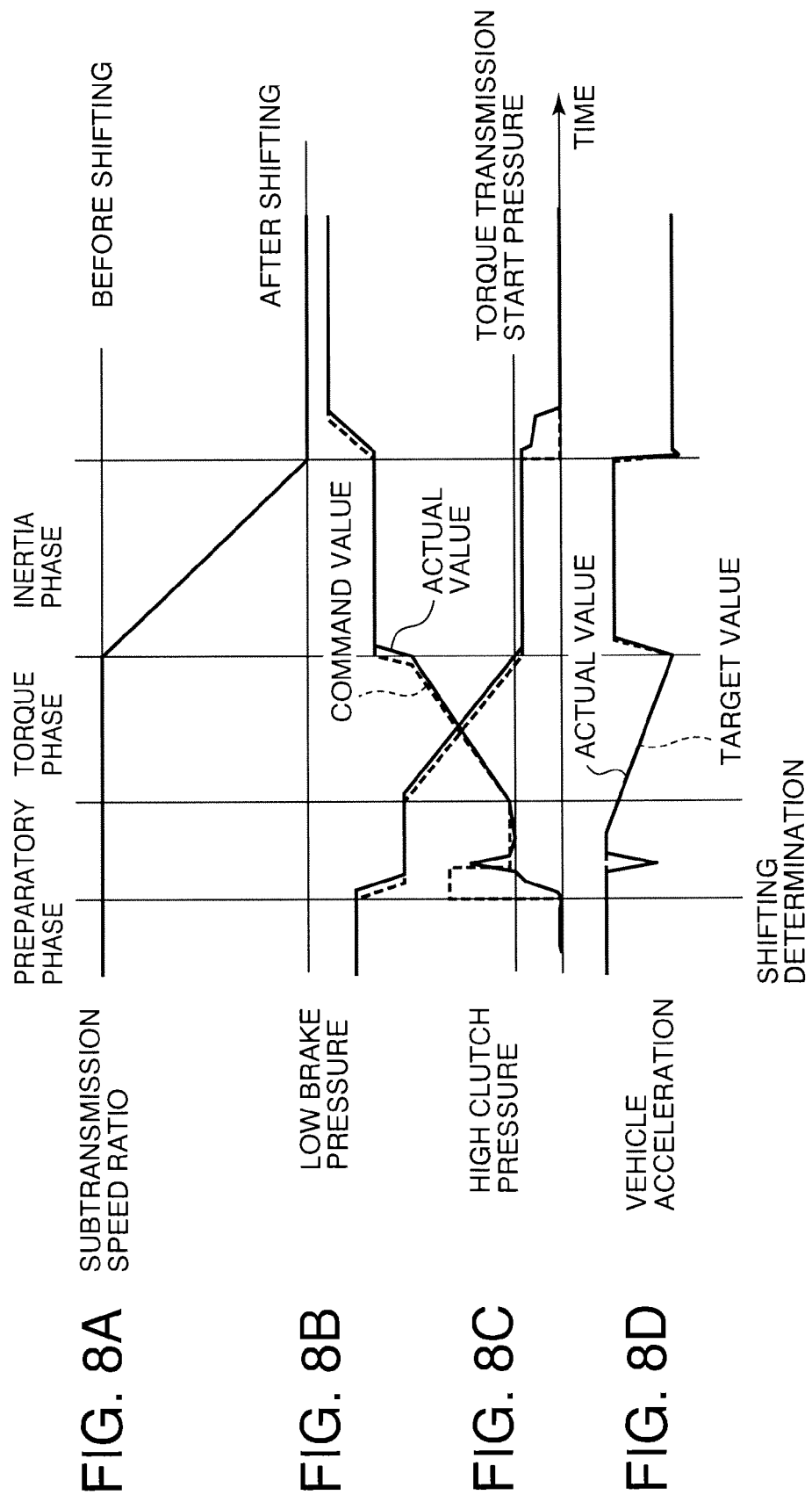
FIGS. 8A-8D are a timing chart of a shift operation that may be executed in the continuously variable transmission when the piston stroke length, measured to the point at which the torque transmission start oil pressure is achieved, is less than the design length on an occasion when shift control according to this invention is not applied.
Figure 9:
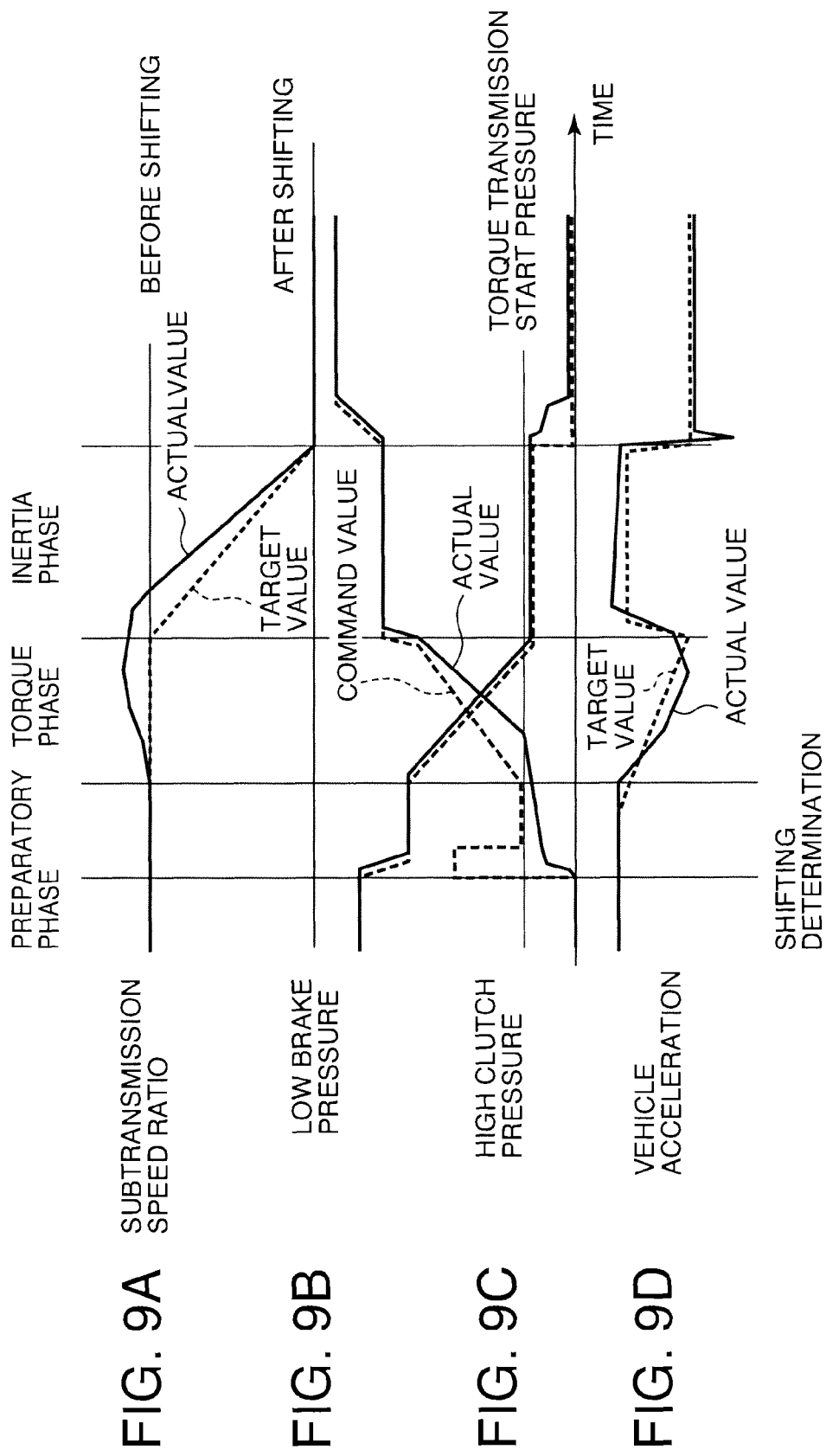
FIGS. 9A-9D are a timing chart of a shift operation that may be executed in the continuously variable transmission when the piston stroke length, measured to the point at which the torque transmission start oil pressure is achieved, is more than the design length on an occasion when shift control according to this invention is not applied.

In this case, the cylinder 303 assumes an excessively large stroke length during the preparatory phase, which starts a torque transmission at the precharge stage. As a result, the vehicle acceleration may drop and a shift shock may occur during the preparatory phase as indicated in FIG. 8D.

FIGS. 9A-9D pertain to a situation in which the stroke length at the actual torque transmission start at the frictional engagement element 300 in the High clutch 33 is more than the stroke length of the cylinder 303 attributable to the precharge oil pressure supplied by the hydraulic control circuit 11.

In this situation, since the cylinder 303 fails to achieve a sufficient stroke length, the cylinder stroke is not completed during the preparatory phase.

If the operation enters the torque phase without completing the cylinder stroke, the friction transmitting portions 304a and 304b will slide without resistance and thus, no torque will be transmitted during an initial period of the torque phase. This, in turn, may lead to an abrupt increase in the engine rotation speed or a shift shock.

In this invention, inconsistencies that tend to occur in the torque transmission start oil pressure and the stroke length of the cylinder 303, due to errors in the manufacture of the cylinder 303, the friction transmitting portions 304a and 304b and due to wear of the cylinder 303 and the friction transmitting portions 304a and 304b attributable to degradation occurring over time, are taken into consideration, values indicating the torque transmission start oil pressure and the stroke length are learned in advance and what has been learned is reflected in the actual engaging operation.

In more specific terms, the transmission controller 12 determines whether or not the current shift operation is to be executed with a shift pattern whereby the torque phase is followed by the inertia phase and if an affirmative determination is made, a learning operation is executed by causing the frictional engagement element 300 to slip and then re-engaging the frictional engagement element 300.

The shift pattern whereby the torque phase is followed by the inertia phase in this context is limited to an upshift operation executed when the throttle opening TVO is equal to or greater than a predetermined degree of opening and a downshift operation executed when the throttle opening is zero.

The transmission controller 12, anticipating such a shift operation based upon the vehicle traveling state, reduces the oil pressure at the frictional engagement element 300 in the Low brake 32 and thus causes a minute slip at the frictional engagement element 300 prior to the start of the actual shift operation.

In the actual shift operation, the oil pressure at the frictional engagement element 300 in the High clutch 33 is raised to the torque transmission start level during the preparatory phase so as to discontinue the minute slip at the frictional engagement element 300 in the Low brake 32.

The transmission controller 12 stores an engaging time period and an engaging speed measured at the time of re-engagement as a value representing an engaging state variation of the first frictional engagement element and corrects the torque transmission start oil pressure and the precharge oil pressure for the frictional engagement element 300 in the High clutch 33 based upon the engaging time period and the engaging speed having been thus stored as the value representing the engaging state variation.

In reference to FIGS. 10A and 10B and FIGS. 18 and 19, the oil pressure correction learning control executed according to this invention by causing a slip of the frictional engagement element 300 is described.

Figure 18:
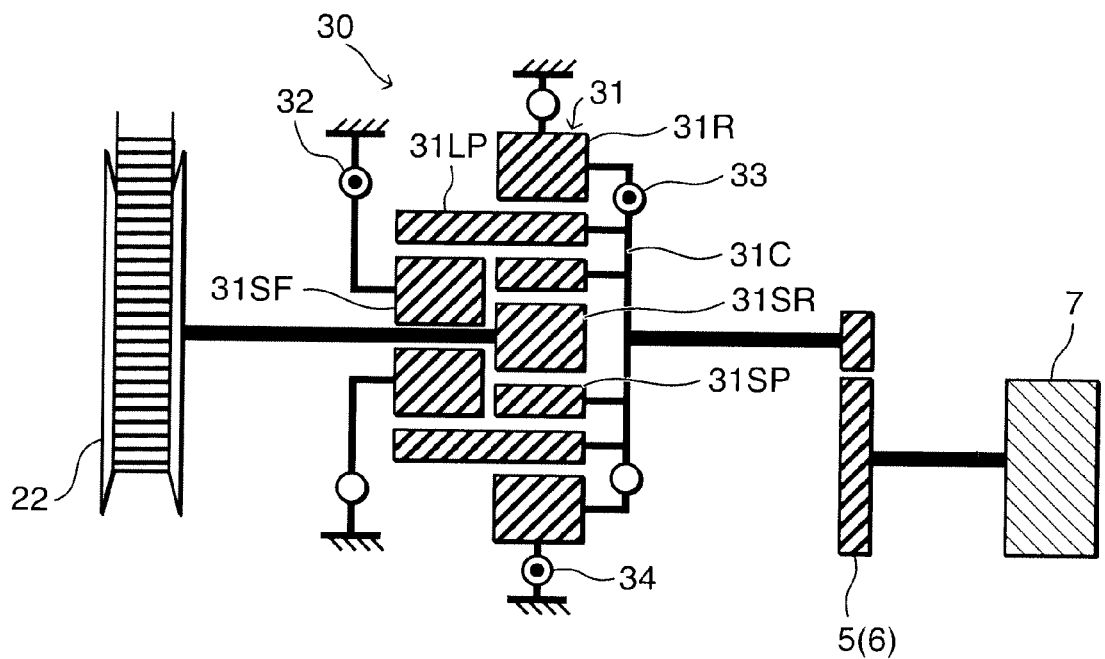
FIG. 18 is a schematic diagram of the configuration of a Ravigneaux planetary gear set used in the subtransmission mechanism.

As shown in FIG. 18, the subtransmission mechanism 30 comprises the Ravigneaux planetary gear mechanism 31, the High clutch 33, the Low brake 32 and the Rev brake 34. The Ravigneaux planetary gear mechanism 31 includes a combination of gears made up with a front sun gear 31SF, a rear sun gear 31SR, a plurality of short pinions 31SP, a plurality of long pinions 31LP and a ring gear 31R and a carrier 31C that supports the long pinions 31LP and the short pinions 31SP.

The short pinions 31SP interlock with the rear sun gear 31SR and the long pinions 31LP, whereas the long pinions 31LP interlock with the short pinions 31SP, the front sun gear 31SF and the ring gear 31R. The rear sun gear 31SR links with the secondary pulley 22 at the variator 20. The carrier 31C provides support so that the plurality of short pinions 31SP and the plurality of long pinions 31LP, each rotating around the axis thereof, are allowed to revolve around the front sun gear 31SF and the rear sun gear 31SR.

The High clutch 33, the Low brake 32 and the Rev brake 34 each includes the built-in frictional engagement element 300 structured as described earlier.

The High clutch 33 assumes a position between the carrier 31C and the ring gear 31R. When the built-in frictional engagement element 300 at the High clutch 33 is in a disengaged state, the carrier 31C and the ring gear 31R are allowed to rotate freely relative to each other, whereas when the frictional engagement element 300 is in an engaged state, the carrier 31C and the ring gear 31R are caused to rotate as one.

The Low brake 32 is disposed between the front sun gear 31SF and the casing of the subtransmission mechanism 30. When the built-in frictional engagement element 300 at the Low brake 32 is in a disengaged state, the front sun gear 31SF is allowed to rotate freely, whereas when the frictional engagement element 300 is in an engaged state, rotation of the front sun gear 31SF is disallowed.

The Rev brake 34 is disposed between the ring gear 31R and the casing of the subtransmission mechanism 30. When the built-in frictional engagement element 300 at the Rev brake 34 is in a disengaged state, the ring gear 31R is allowed to rotate freely, whereas when the frictional engagement element 300 is in an engaged state, rotation of the ring gear 31R is disallowed.

When the Rev brake 34 and the High clutch 33 are in a disengaged state and the Low brake 32 is in an engaged state, the rotation of the secondary pulley 22 at the variator 20 is output from the carrier 31C to the second gear train 5 via the rear sun gear 31SR and the short pinions 31SP. The ratio of the input rotation speed and the output rotation speed at the subtransmission mechanism 30 under these conditions is greater than 1.0.

When the Rev brake 34 and the Low brake 32 are in a disengaged state and the High clutch 33 is in an engaged state, the rear sun gear 31SR, the short pinions 31SP, the long pinions 31LP, the front sun gear 31SF and the ring gear 31R rotate as one, and the output rotation of the secondary pulley 22 at the variator 20 is output from the carrier 31C to the second gear train 5 without increasing or decreasing the rotation speed. The ratio of the input rotation speed and the output rotation speed at the subtransmission mechanism 30 under these conditions is equal to 1.0.

When the Low brake 32 and the High clutch 33 are in a disengaged state and the Rev brake 34 is in an engaged state, rotation of the rear sun gear 31SR, rotating as one with the secondary pulley 22 at the variator 20, is transmitted to the short pinions 31SP, the long pinions 31LP and the front sun gear 31SF. At this time, as the rotation of the ring gear 31R is disallowed with the Rev brake, the carrier 31C is caused to rotate along the reverse direction and the reverse rotation is output to the second gear train 5.

Figure 19:
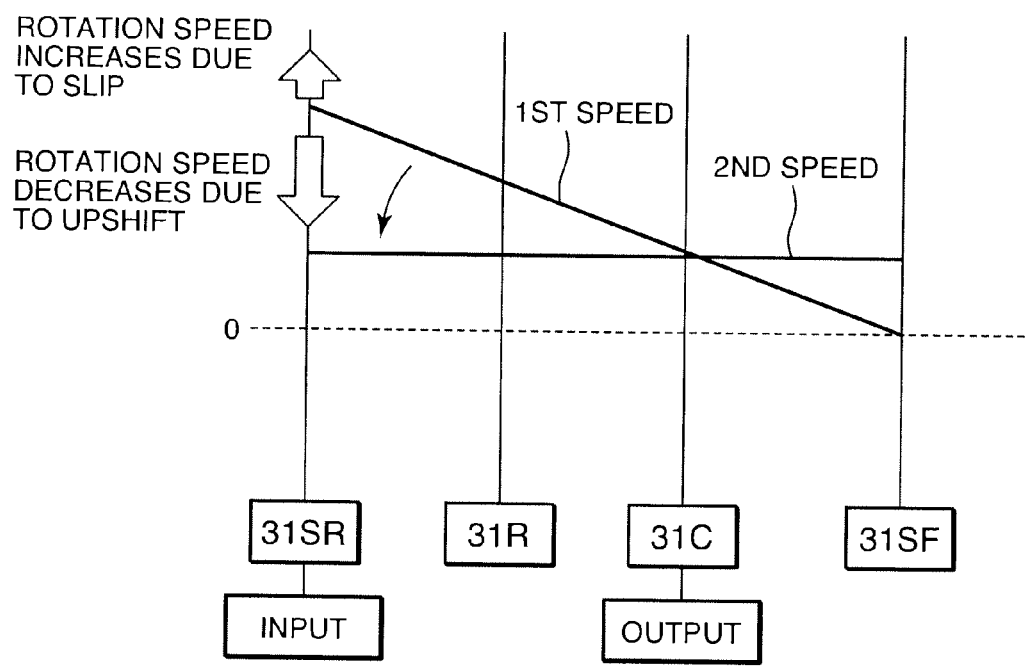
FIG. 19 is a nomographic chart indicating the relationships between the shift speed at the subtransmission mechanism and the rotation speeds of various parts.

As FIG. 19 indicates, when the second speed gear position is assumed at the subtransmission mechanism 30, the rear sun gear 31SR, the ring gear 31R, the carrier 31C and the front sun gear 31SF all rotate as one at a uniform speed. At the first speed, assuming that the carrier 31C, i.e., the rotation output member that outputs rotation to the second gear train, rotates at the same rotation speed, the ring gear 31R and the rear sun gear 31SR rotate at speeds higher than the first speed as the rotation speed at the front sun gear 31SF is reduced to zero via the Low brake 32.

At the first speed, as the engaging pressure at the Low brake 32 is reduced to allow a minute slip of the Low brake 32, the front sun gear 31SF having been in the zero rotation speed state experiences a minute slip occurring along the downward direction in the figure, i.e., along the direction opposite from the rotating direction along which the rear sun gear 31SR rotates. As a result, the rotation speeds at the ring gear 31R and the rear sun gear 31SR increase. In other words, the speed input to the subtransmission mechanism 30 increases, as indicated by the upward-pointing arrow in the figure.

As an engaging pressure is supplied to the High clutch 33 in this state, the line representing the first speed in the diagram changes along the direction in which its slope is reduced, i.e., toward the second speed line. As a result, the minute slip having occurring at the Low brake 32 is terminated and the speed input to the subtransmission mechanism 30 decreases, as indicated by the downward-pointing arrow in the figure.

The learning operation according to this invention, is executed as part of an upshift operation at the subtransmission mechanism 30, by taking advantage of the phenomenon described above.

Figure 10:
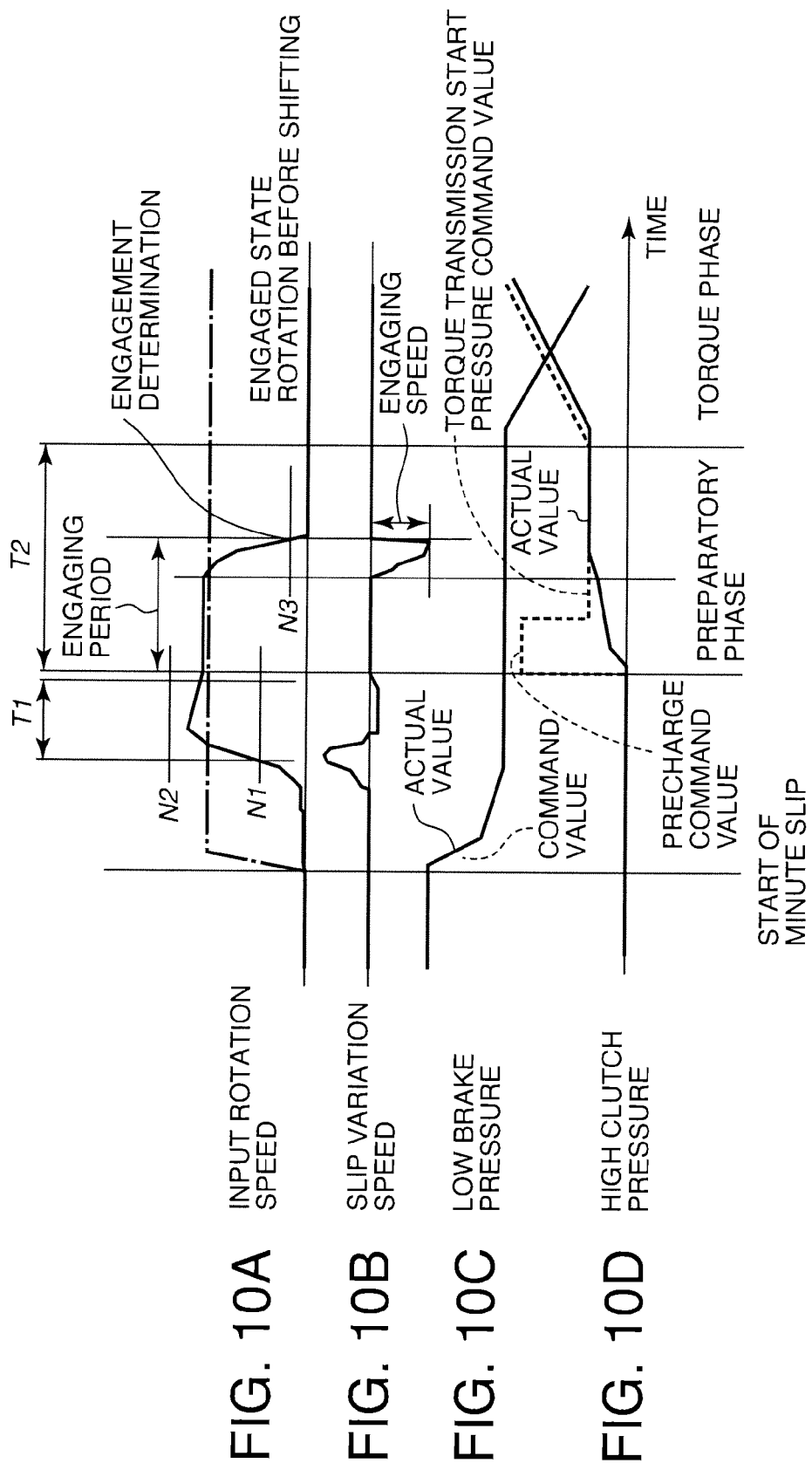
FIGS. 10A-10D are a timing chart of a slip characteristics learning operation executed by the transmission controller according to this invention when a subtransmission mechanism attempts an upshift while an internal combustion engine is in a loaded state.
Figure 11:
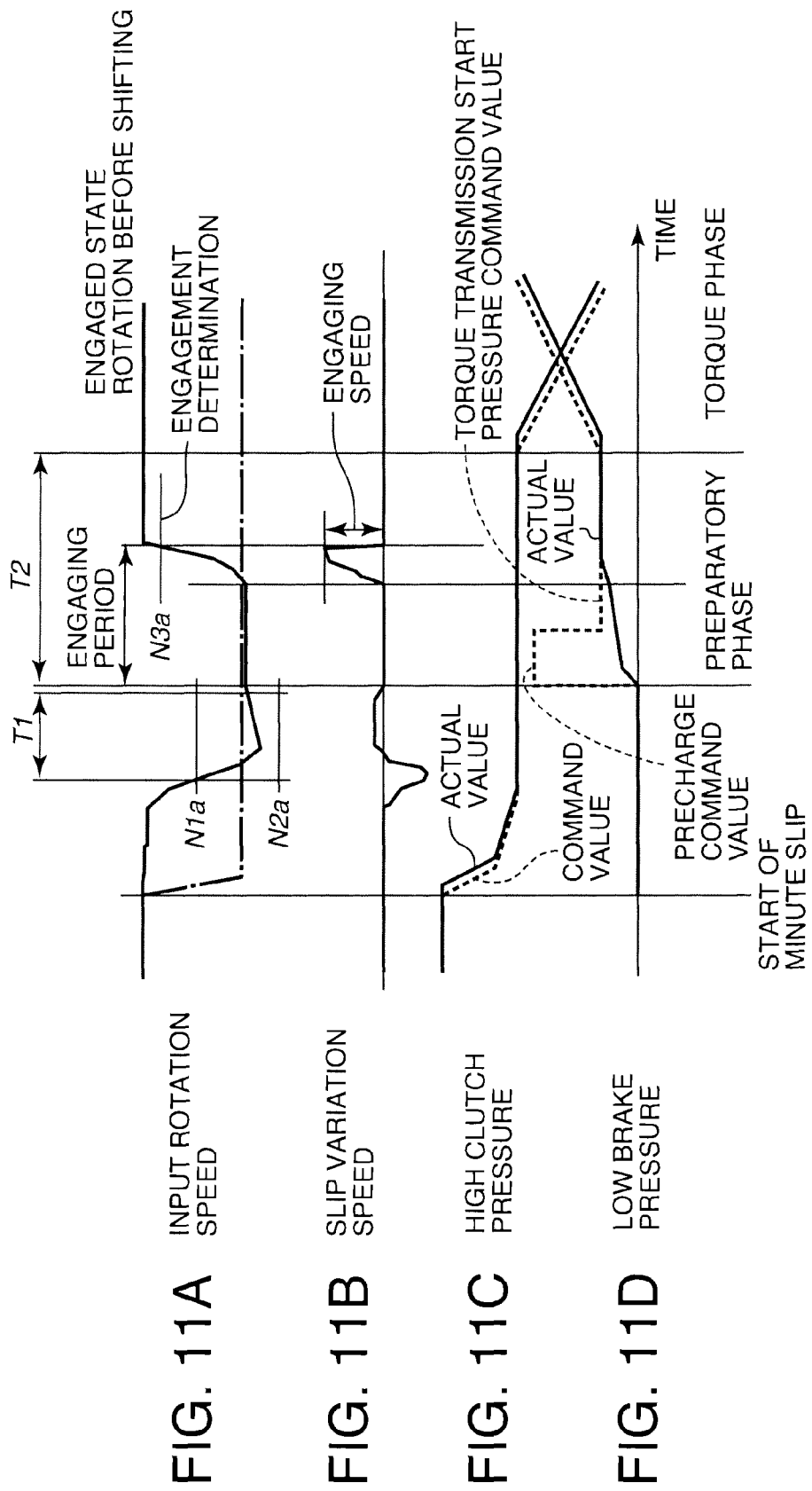
FIGS. 11A-11D are a timing chart of a slip characteristics learning operation executed by the transmission controller according to this invention when the subtransmission mechanism attempts an downshift while an internal combustion engine is in a no-load state.

Referring to FIG. 10 next, the learning operation executed as part of an upshift operation for shifting the gear position at the subtransmission mechanism 30 from the first speed to the second speed when the throttle opening TVO is equal to or greater than the predetermined degree of opening, is described.

When the throttle opening TVO is equal to or greater than the predetermined degree of opening, the transmission controller 12, upon determining that an upshift operation is to be executed at the subtransmission mechanism 30, reduces the oil pressure at the frictional engagement element 300 in the Low brake 32, thereby causing a minute slip of the Low brake 32, in preprocessing preceding the preparatory phase. The extent of the minute slip should be set to a level at which the torque transmission start oil pressure correction amount and the precharge oil pressure correction amount can be accurately determined at the time of re-engagement of the frictional engagement element 300 without subjecting the driver of the vehicle to any unpleasant sensation. To satisfy this condition, the minute slip is controlled such that the input rotation speed at the subtransmission mechanism 30 is within a range between a first upshift threshold value N1 and a second upshift threshold value N2.

When the input rotation speed at the subtransmission mechanism 30 has stayed within this range for longer than a minute slip determination time period T1, the transmission controller 12 determines that the minute slip has been generated stably. The transmission controller 12, having caused the minute slip, starts the preparatory phase while sustaining the state of slippage within the range between the first upshift threshold value N1 and the second upshift threshold value N2.

In the preparatory phase, the transmission controller 12 first executes control so as to adjust the oil pressure at the High clutch 33 to the precharge oil pressure level and then increases the oil pressure at the High clutch 33 to the torque transmission start oil pressure level.

As the pressure of oil supplied to the frictional engagement element 300 at the High clutch 33 increases, the minute slip having been caused at the Low brake 32 as described above, is discontinued and the frictional engagement element 300 in the Low brake 32 reenters the engaged state. The transmission controller 12 determines that the minute slip has terminated and the Low brake 32 has been re-engaged when the input rotation speed at the subtransmission mechanism 30 becomes lower than an upshift engagement determination rotation speed N3.

The transmission controller 12 measures the length of time elapsing between the time point at which the increase in the engaging pressure at the High clutch 33 starts, i.e., the precharge start time point, and the time point at which the frictional engagement element 300 in the Low brake 32 becomes completely re-engaged. The length of time thus measured is to be hereafter referred to as an "engaging time period".

In addition, the transmission controller 12 individually measures the speed assumed between the re-engagement start time point and the re-engagement completion time point and the length of time elapsing between the re-engagement start time point and the re-engagement completion time point, respectively as an engaging speed and an engaging time period, with respect to the minute slip at the Low brake 32. The engaging time period and the engaging speed thus measured are stored into the storage device 122. It is to be noted that the absolute value indicating the engaging speed is stored into the storage device 122.

Based upon the engaging time period and the engaging speed, the transmission controller 12 learns the torque transmission start oil pressure correction amount and the precharge oil pressure correction amount for the High clutch 33.

The input rotation speed at the subtransmission mechanism 30 may be calculated based upon the primary rotation speed Npri and the speed ratio vRatio at the variator 20. The output rotation speed at the subtransmission mechanism 30 may be calculated based upon, for instance, the vehicle speed VSP detected by the vehicle speed sensor 43 and the reduction ratio achieved via the second gear train 5 and the final reduction gear 6.

The transmission controller 12 executes a similar learning operation as part of a downshift operation at the subtransmission mechanism 30 when the throttle opening TVO is equal to or greater than the predetermined degree of opening.

Referring to FIGS. 11A-11D, when the degree of throttle opening is zero, the transmission controller 12, upon determining that a downshift operation is to be executed at the subtransmission mechanism 30, reduces the pressure of oil supplied to the frictional engagement element 300 in the High clutch 33, thereby causing a minute slip of the High clutch 33 in preprocessing preceding the preparatory phase. The minute slip is controlled such that the input rotation speed at the subtransmission mechanism 30 is within the range between a first downshift threshold value N1a and a second downshift threshold value N2a.

When the input rotation speed at the subtransmission mechanism 30 has stayed within this range for longer than a minute slip determination time period T1, the transmission controller 12 determines that the minute slip has been generated stably. The transmission controller 12, having caused the minute slip, starts the preparatory phase while sustaining the state of slippage within the range between the first downshift threshold value N1a and the second downshift threshold value N2a.

In the preparatory phase, the transmission controller 12 first executes control so as to adjust the oil pressure at the Low brake 32 to the precharge oil pressure level and then increases the oil pressure at the Low brake 32 to the torque transmission start oil pressure level.

As the oil pressure at the Low brake 32 increases, the minute slip is discontinued and the High clutch 33 becomes re-engaged. The transmission controller 12 determines that the minute slip has terminated and the High brake 33 has been completely re-engaged when the input rotation speed at the subtransmission mechanism 30 becomes greater than a downshift engagement determination rotation speed N3a. The transmission controller 12 obtains values indicating the engaging time period and the engaging speed measured as the High clutch 33 becomes re-engaged and stores the obtained values into the storage device 122. It is to be noted that the absolute value representing the engaging speed is stored into the storage device 122.

Based upon the engaging time period and the engaging speed, the transmission controller 12 learns the torque transmission start oil pressure correction amount and the precharge oil pressure correction amount for the Low brake 32.

Figure 12:
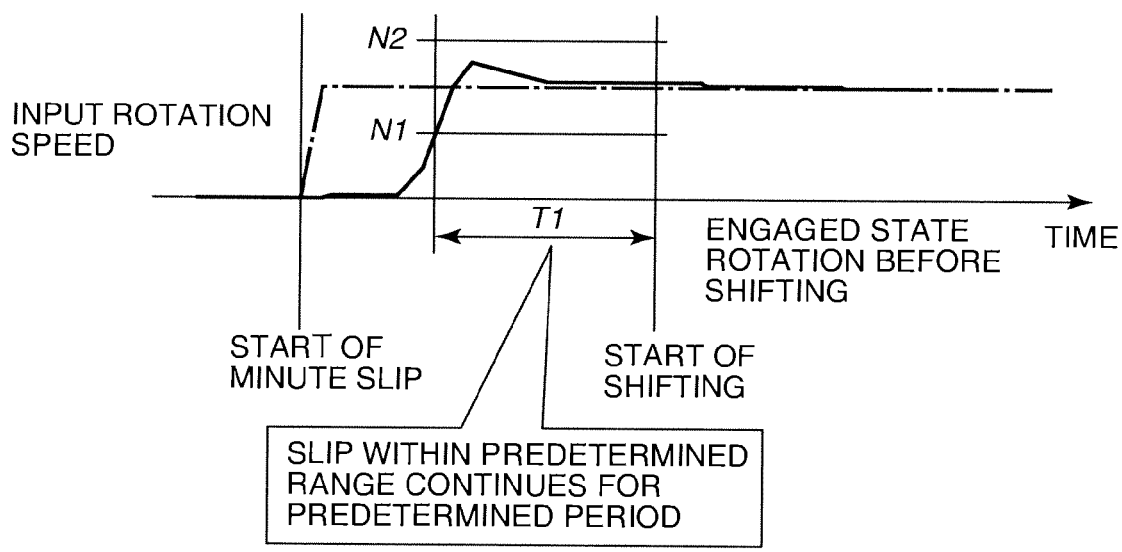
FIG. 12 is a diagram illustrating an algorithm adopted by the transmission controller according to this invention when determining whether or not to allow a minute slip to continue.

The transmission controller 12 executes the learning operations described above if the minute slip occurring at the Low brake 32 is sustained over the minute slip determination time period T1 within the predetermined input rotation speed range between N1 and N2 as shown in FIG. 12, or if the minute slip occurring at the High clutch 32 is sustained over the minute slip determination time period T1 within the predetermined input rotation speed range between N1a and N2a.

In other words, the transmission controller 12 is only engaged in a learning operation executed based upon the process of re-engagement following a minute slip that stably sustains the state of slippage, instead of an unstable slip. The first threshold value N1(N1a) and the second threshold value N2(N2a) are determined such that a predetermined rotation speed band is set on either side of an input rotation speed at the subtransmission mechanism 30 that corresponds to a predetermined minute slip. When the input rotation speed at the subtransmission mechanism 30 is in this range for longer than the minute slip determination time period T1, it is determined that the minute slip has been generated stably and the learning operation is then executed. By determining as to whether or not the minute slip is generated stably preceding the learning operation, learning is prevented from being performed in a case, for example, where the input rotation speed at the subtransmission mechanism 30 has shown a rapid increase beyond the second upshift threshold value N2 such that the resultant minute slip is unstable. The learning operation is conducted only when a stable minute slip has been generated.

Figure 13:
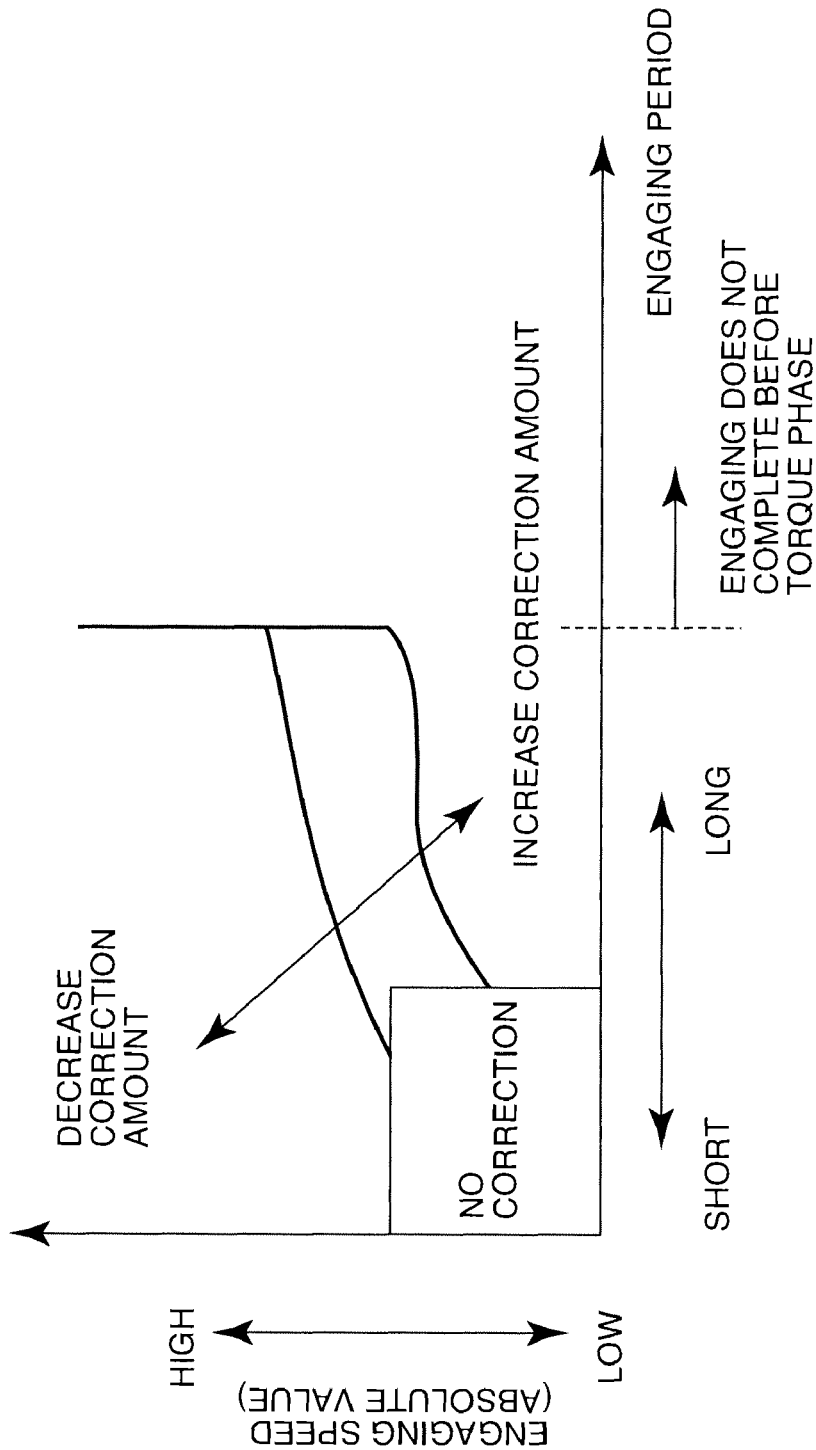
FIG. 13 is a diagram illustrating the characteristics of a torque transmission start oil pressure correction amount map used by the transmission controller according to this invention.
Figure 14:
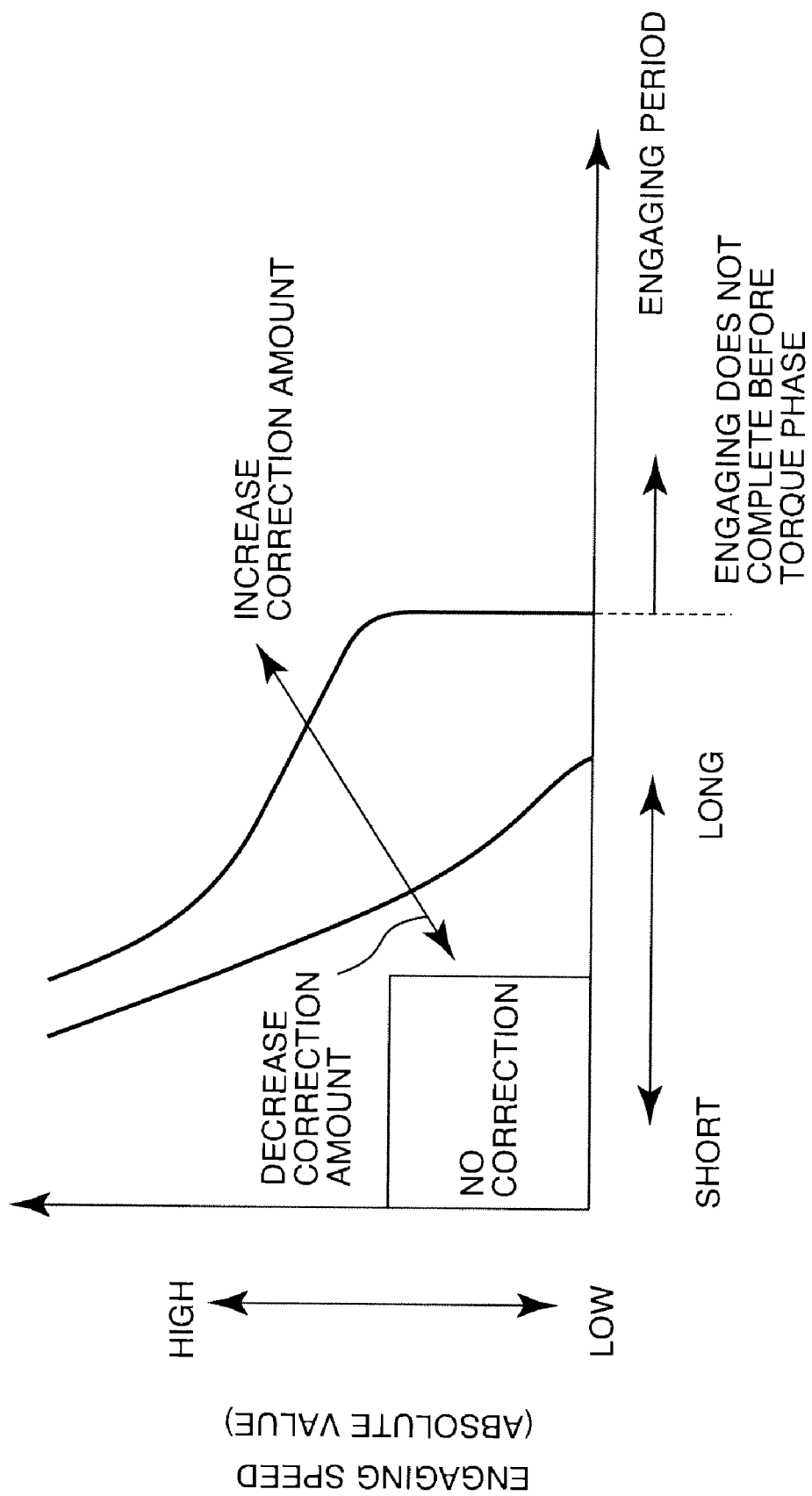
FIG. 14 is a diagram illustrating the characteristics of a precharge oil pressure correction amount map used by the transmission controller according to this invention.

The transmission controller 12 determines the torque transmission start oil pressure correction amount and the precharge oil pressure correction amount for the High clutch 33 or the torque transmission start oil pressure correction amount and the precharge oil pressure correction amount for the Low brake 32 based upon the engaging time period and the engaging speed having been stored in the storage device 122, by referencing the torque transmission start oil pressure correction amount map assuming the characteristics indicated in FIG. 13 and the precharge oil pressure correction amount map assuming the characteristics indicated in FIG. 14. The transmission controller 12 then updates the stored correction quantities with the newly determined correction quantities.

Referring to FIG. 13, a smaller correction amount for the torque transmission start oil pressure at the High clutch 33 or the Low brake 32 is given as the engaging time periods becomes shorter and the engaging speed becomes higher. In contrast, a larger correction amount is given as the engaging time period becomes longer and the engaging speed becomes lower.

When the engaging time period is long or the engaging speed is low, the pressure level of the oil being supplied to the corresponding member may not be sufficient relative to the actual torque transmission start oil pressure. Accordingly, the corresponding correction amount is increased through the learning operation.

As FIGS. 13 and 14 indicate, the range over which the engaging time period is short and the engaging speed is low represents a situation that could not occur under normal circumstances. Accordingly, an erroneous learning operation is prevented over this range by selecting a setting that disallows correction amount update.

If the process of re-engagement is not completed during the preparatory phase and re-engagement is still not achieved even after the torque phase starts, the control oil pressure should be assumed to manifest a significant extent of inconsistency. In such a situation, the correction quantities should be increased regardless of the engaging time period and the engaging speed.

Referring to FIGS. 15A, 15B and FIGS. 16A, 16B, the re-engaging time period/speed learning routines executed by the transmission controller 12 to enable the control described above are explained.

Figure 15A:
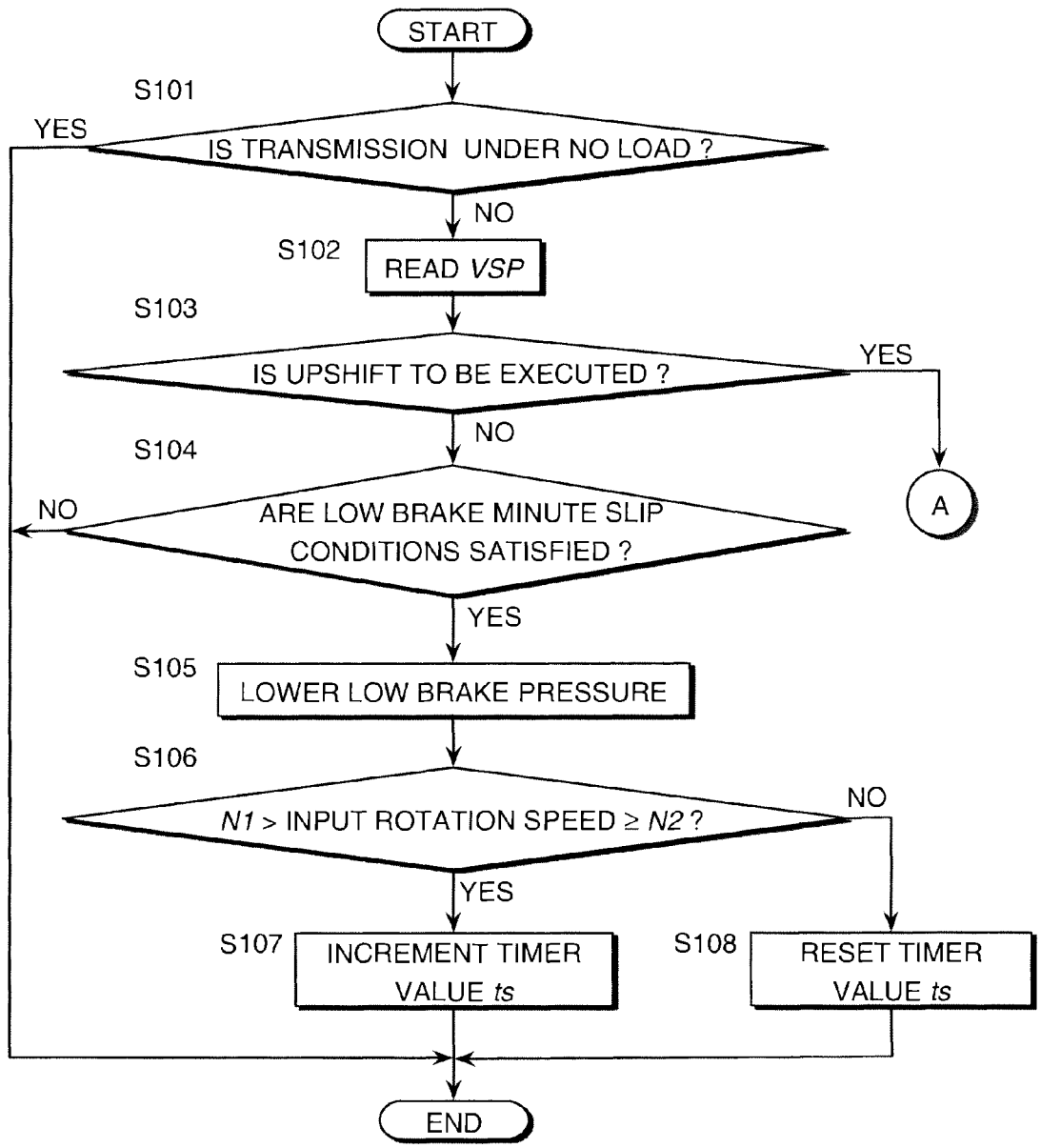
FIGS. 15A and 15B are a flowchart of a re-engaging time period/speed learning routine executed by the transmission controller according to this invention when the subtransmission mechanism attempts an upshift.
Figure 15B:
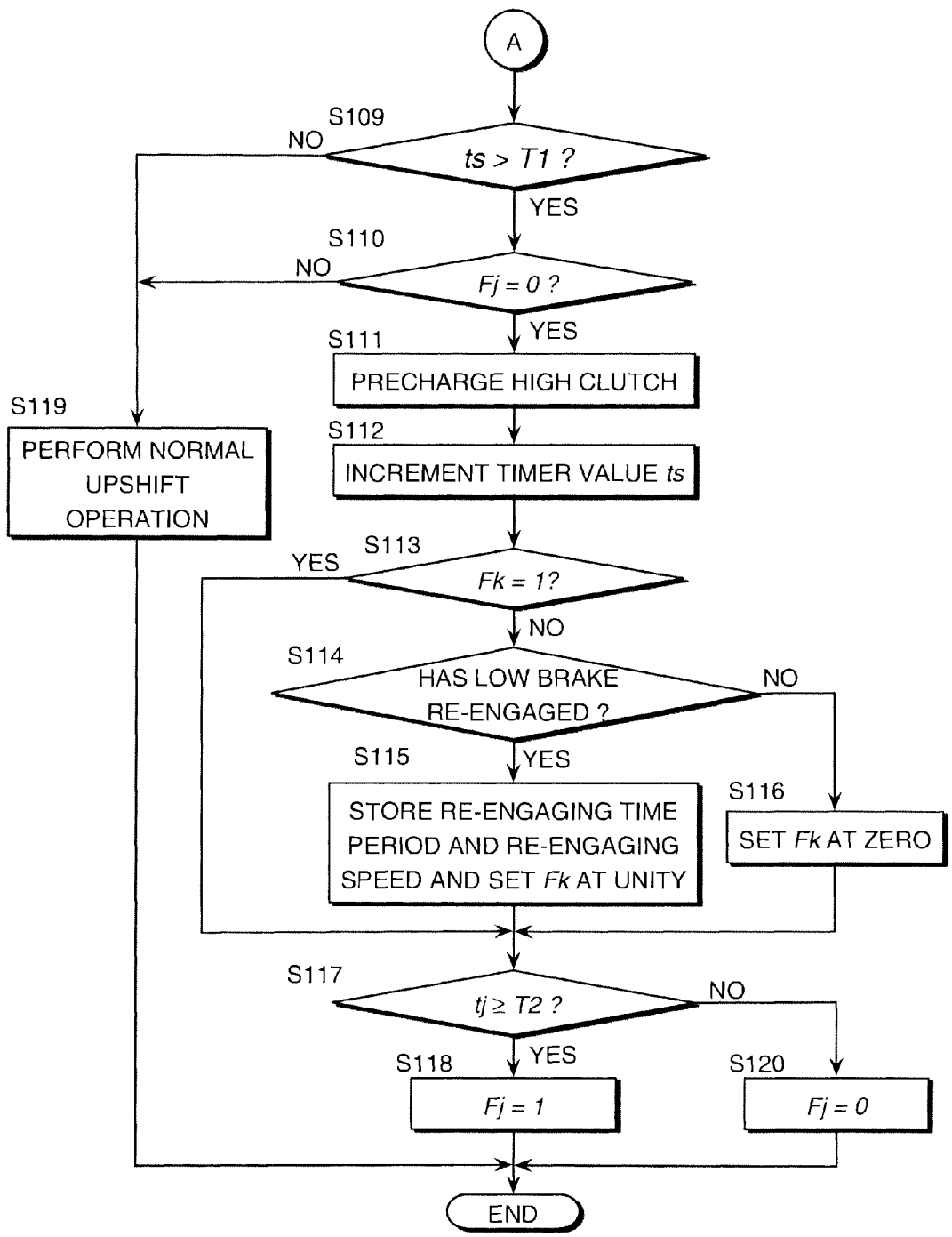

The transmission controller 12 repeatedly executes the upshift re-engaging time period/speed learning routine in FIGS. 15A and 15B over a predetermined time interval, e.g., 10 milliseconds.

In a step S101, the transmission controller 12 determines whether or not the continuously variable transmission 4 is currently in a loaded state. More specifically, the transmission controller 12 reads the throttle opening TVO and determines that the continuously variable transmission 4 is under load if the throttle opening TVO is equal to or greater than a predetermined degree of opening.

If no load is currently applied to the continuously variable transmission 4, the transmission controller 12 ends the routine without executing further processing.

If the continuously variable transmission 4 is under load, the transmission controller 12 reads the vehicle speed VSP in a step S102. It is to be noted that if the throttle opening TVO has not been used in the determination in the step S101, the throttle opening TVO should also be read in the step S102.

In a step S103, the transmission controller 12 determines whether or not the upshift from the first speed to the second speed is to be executed on the basis of the vehicle speed VSP and throttle opening TVO. For example, when an operation point of the continuously variable transmission 4 moves from X to Z across the mode switch line as shown in FIG. 3, it is determined that the upshift from the first speed to the second speed is to be executed.

If it is determined that the upshift from the first speed to the second speed is to be executed, the transmission controller 12 executes the processing in a step S109 and subsequent steps.

If it is determined that the upshift from the first speed to the second speed is not to be executed, the transmission controller 12 determines in a step S104 whether or not conditions for causing a minute slip at the Low brake 32 are satisfied. This determination may be conducted as follows.
(1) A minute slip determination line as shown in FIG. 3 is previously set on the high-speed/low vehicle speed side of the mode switch line, and
(2) when the operation point of the continuously variable transmission 4 is between these lines, e.g., at a point Y, it is determined that the conditions for causing a minute slip at the Low brake 32 are satisfied.

The reason for setting the minute slip determination line on the high-speed/low vehicle speed side of the mode switch line is to ensure a time required for causing a minute slip then terminating the same before starting shifting operation of the continuously variable transmission 4 under load.

If it is determined in the step S104 that the conditions for causing the minute slip at the Low brake 32 are not satisfied, the transmission controller 12 promptly ends the routine.

However, if it is determined in the step S104 that the conditions for causing the minute slip at the Low brake 32 are satisfied, the transmission controller 12 lowers the pressure of oil supplied to the frictional engagement element 300 at the Low brake 32 in a step S105.

In a next step S106, the transmission controller 12 determines whether or not the extent of the slip having occurred at the Low brake 32 is within a predetermined rotation speed difference range. Specifically, it is determined if the input rotation speed at the subtransmission mechanism 30 is within the range between the first upshift threshold value N1 and the second upshift threshold value N2. If this determination is affirmative, it is determined that the extent of the slip having occurred at the Low brake 32 is within the predetermined rotation rate difference range.

If the extent of the slip having occurred is within the predetermined rotation speed difference range, the transmission controller 12 increments a timer value ts in a step S107 in order to measure the length of time over which the state of slippage is sustained. In this step S107, the time period during which the input rotation speed at the subtransmission mechanism 30 is within the range between the first upshift threshold value N1 and the second upshift threshold value N2 is measured.

If the extent of the slip having occurred is beyond the predetermined rotation speed difference range, the transmission controller 12 stops the timer, stores the timer value ts into the storage device 122 and clears the timer in a step S108.

After completing the processing in the step S107 or in the step S108, the transmission controller 12 ends the routine.

If it is determined in the step S103 that the preparatory phase has started, the transmission controller 12 determines in a step S109 whether or not a state of slippage, the extent of which is within the predetermined rotation speed difference range, has been sustained at the Low brake 32 over a predetermined length of time, based upon the timer value stored in the storage device 122. In other words, it is determined whether or not the time period is during which the input rotation speed at the subtransmission mechanism 30 is within the range between the first upshift threshold value N1 and the second upshift threshold value N2 is greater than the minute slip determination time period T1.

If a negative determination is made in the step S109, or in other words when ts>T1 does not hold, the transmission controller 12 engages the subtransmission mechanism 30 in a normal upshift operation in a step S119 before ending the routine without executing a learning operation based upon the results of the minute slip.

If an affirmative determination is made in the step S109, or in other words when ts>T1 holds, the transmission controller 12 determines, in a step S110, whether or not the current shift control phase is the preparatory phase. The determination is performed by determining whether or not a preparatory phase termination flag Fj is at zero. The preparatory phase termination flag Fj will be described later.

If the current shift control phase is not the preparatory phase, or in other words preparatory phase termination flag Fj is not at zero, the transmission controller 12 proceeds to the step S119 to engage the subtransmission mechanism 30 in a normal upshift operation. The term "normal upshift operation" used in this context may be an operation executed based upon the pattern shown in FIGS. 4A-4G, comprising the preparatory phase, torque phase, inertia phase, and terminal phase. This operation is executed through a separate routine. After proceeding to execute the normal upshift operation, the transmission controller 12 ends the routine and does not execute the subsequent routine. It should be noted that when the processing of the step S119 is performed following the negative determination in the step S110, it means that the preparatory phase has been terminated. In this case, the transmission controller immediately starts the torque phase in the step S119.

If the current shift control phase is the preparatory phase, or in other words, if the preparatory phase termination flag Fj is at zero, the transmission controller 12 controls the oil pressure supplied to the frictional engagement element 300 at the High clutch 33 in a step S111. In more specific terms, the transmission controller 12 commands the hydraulic control circuit 11 to first supply the High clutch 33 with a predetermined precharge oil pressure and then supply the High clutch 33 with a torque transmission start oil pressure. As a result, the actual oil pressure in the frictional engagement element 300 at the High clutch 33 shows a gradual increase as shown in FIG. 10D.

In a step S112, the transmission controller 12 increments the timer value ts in order to measure the engaging time period.

In a step S113, the transmission controller 12 determines whether or not the re-engagement determination with regard to the frictional engagement element 300 at the Low brake 32 has been completed. Specifically, this determination is performed by determining whether or not a data storing complete flag Fk is at unity. The data storing complete flag Fk is set in a steps S115 and S116, the processings of which will be described later.

If the re-engagement determination for the frictional engagement element 300 at the Low brake 32 has been completed, or in other words the data storing complete flag Fk is at unity, the transmission controller 12 proceeds to execute the processing in a step S117 and subsequent steps. It should be noted that the processing in the step S117 is performed in a state where the pressure of oil supplied to the frictional engagement element 300 at the Low brake 32 is lowered in the step S105.

If the re-engagement determination for the frictional engagement element 300 at the Low brake 32 has not been completed, or in other words the data storing complete flag Fk is at zero, the transmission controller 12 determines in a step S114 whether or not the frictional engagement element 300 at the Low brake 32, having been in the state of minute slippage, has become completely re-engaged.

More specifically, the transmission controller 12 determines whether or not the process of re-engagement has been completed by determining whether or not the input rotation speed at the subtransmission mechanism 30 has become lower than the engagement determination rotation speed N3. If this determination is affirmative, it is determined that the process of re-engagement has been completed and if this determination is negative, it is determined that the process of re-engagement has not been completed.

If the process of re-engagement of the frictional engagement element 300 at the Low brake 32 has not been completed, the transmission controller 12 sets the data storing complete flag Fk at zero in the step S116. As a result, the determination in the step S114 is performed again on the next occasion when the routine is performed.

If the process of re-engagement of the frictional engagement element 300 at the Low brake 32 has been completed, the transmission controller 12 measures the engaging time period and the engaging speed corresponding to this particular minute slip and stores the measured values into the storage device 122 in a step S115. The transmission controller 12 then sets the data storing complete flag Fk at unity.

Upon executing the processing in the step S115 or S116, the transmission controller 12 determines, based upon the timer count value, whether or not the length of time having elapsed through the preparatory phase has become equal to a preselected time period T2, in a step S117. More specifically, the transmission controller 12 determines if the length of time tj having elapsed through the preparatory phase has become equal to the preselected time period T2.

If the determination in the step S117 is affirmative, the transmission controller 12 sets the preparatory phase termination flag Fj at unity in a step S118 and terminates the routine.

If the determination in the step S117 is negative, the transmission controller 12 sets the preparatory phase termination flag Fj at zero in a step S120 and terminates the routine.

By executing the routine as described above, the transmission controller 12 causes a minute slip at the Low brake 32 immediately before an upshift is executed at the subtransmission mechanism 30 in a loaded state and measures the re-engaging time period and the re-engaging speed in correspondence to this slip.

Figure 17A:
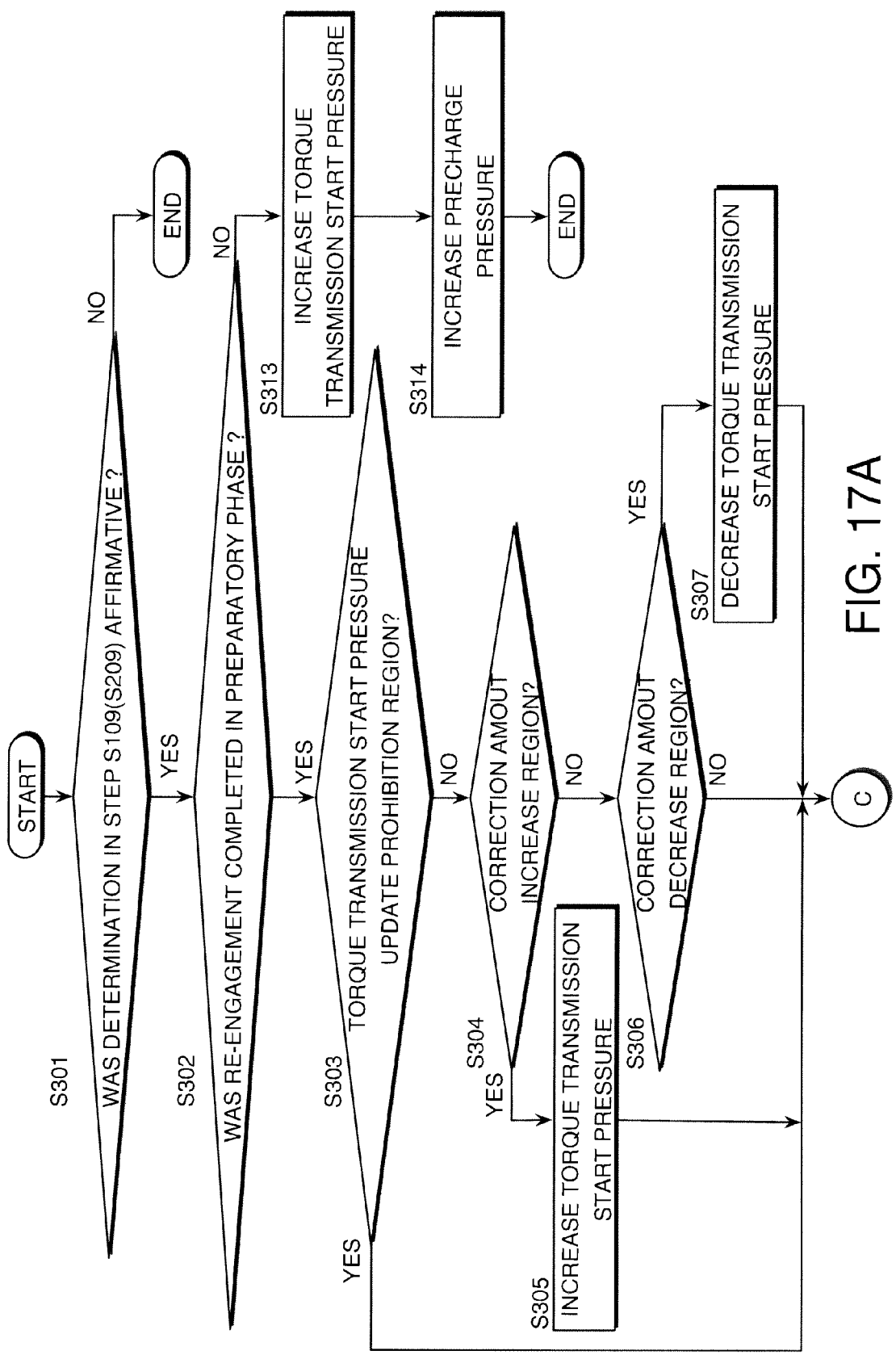
FIGS. 17A and 17B are a flowchart of a torque transmission start oil pressure/precharge oil pressure correction amount update routine executed by the transmission controller according to this invention.
Figure 17B:
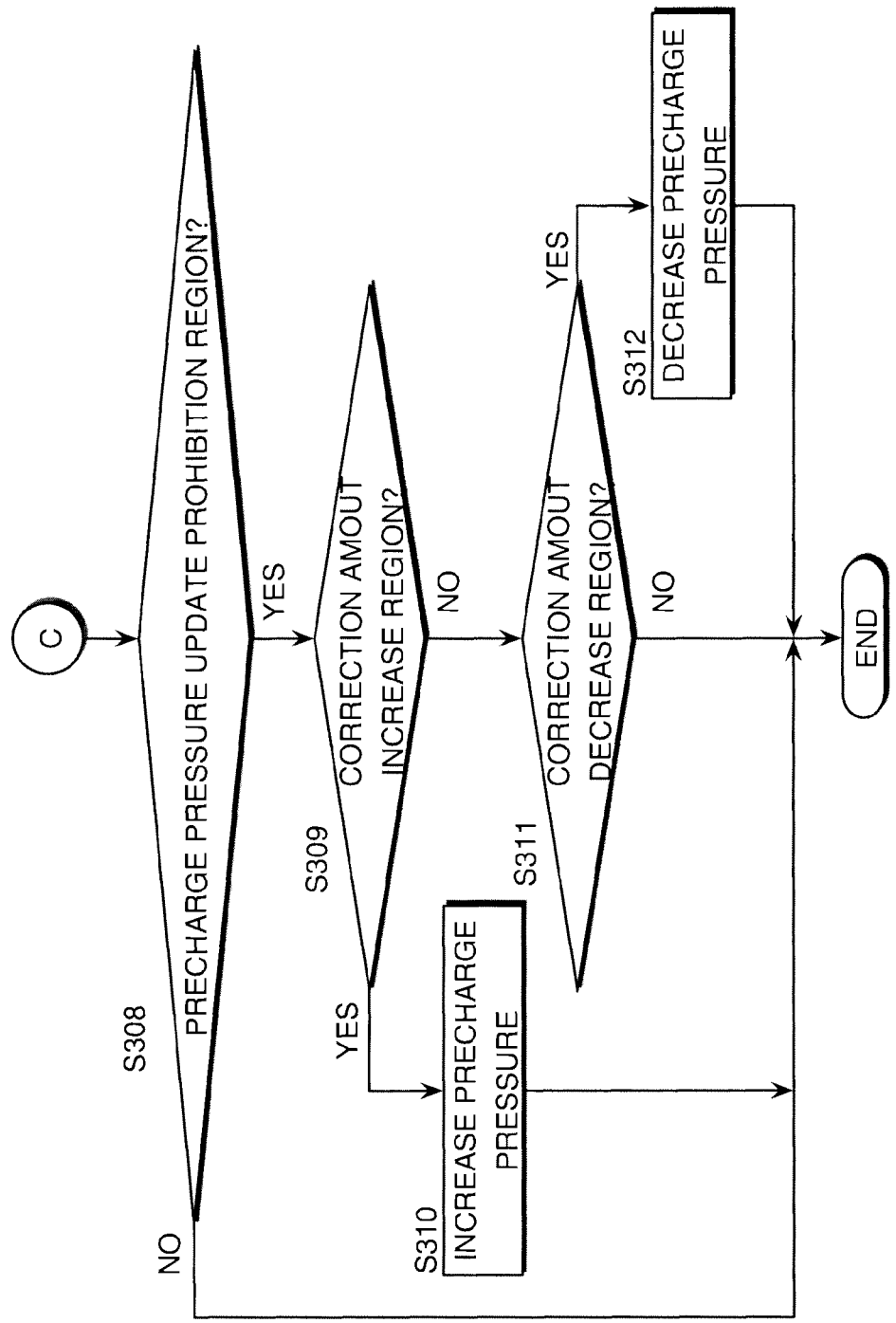

The engaging time period and the engaging speed measured through the process described above are used in the torque transmission start oil pressure/precharge oil pressure correction amount update routine shown in FIGS. 17A and 17B, which is executed following the completion of the upshift operation.

Figure 16A:
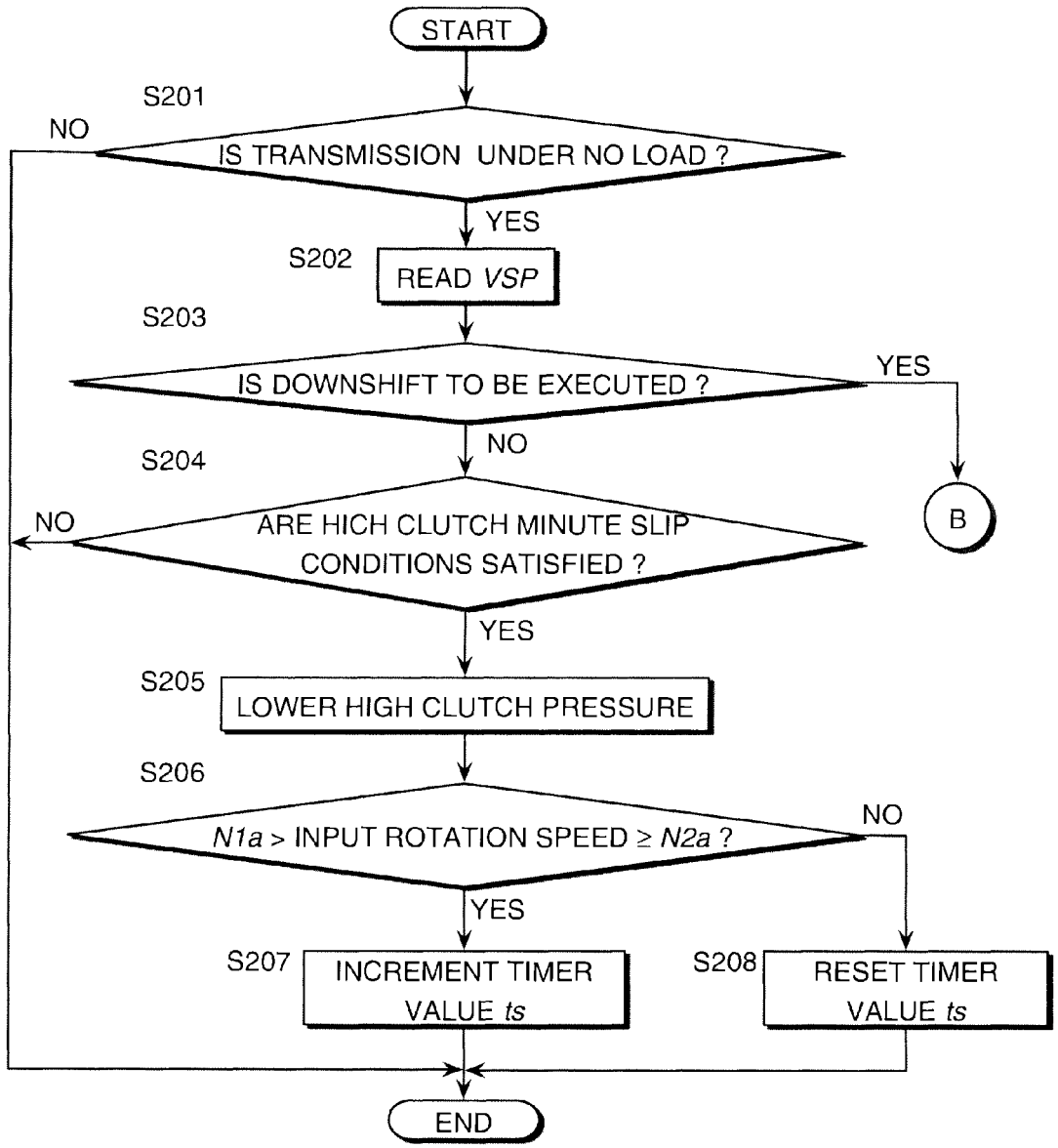
FIGS. 16A and 16B are a flowchart of a re-engaging time period/speed learning routine executed by the transmission controller according to this invention when the subtransmission mechanism attempts a downshift.
Figure 16B:
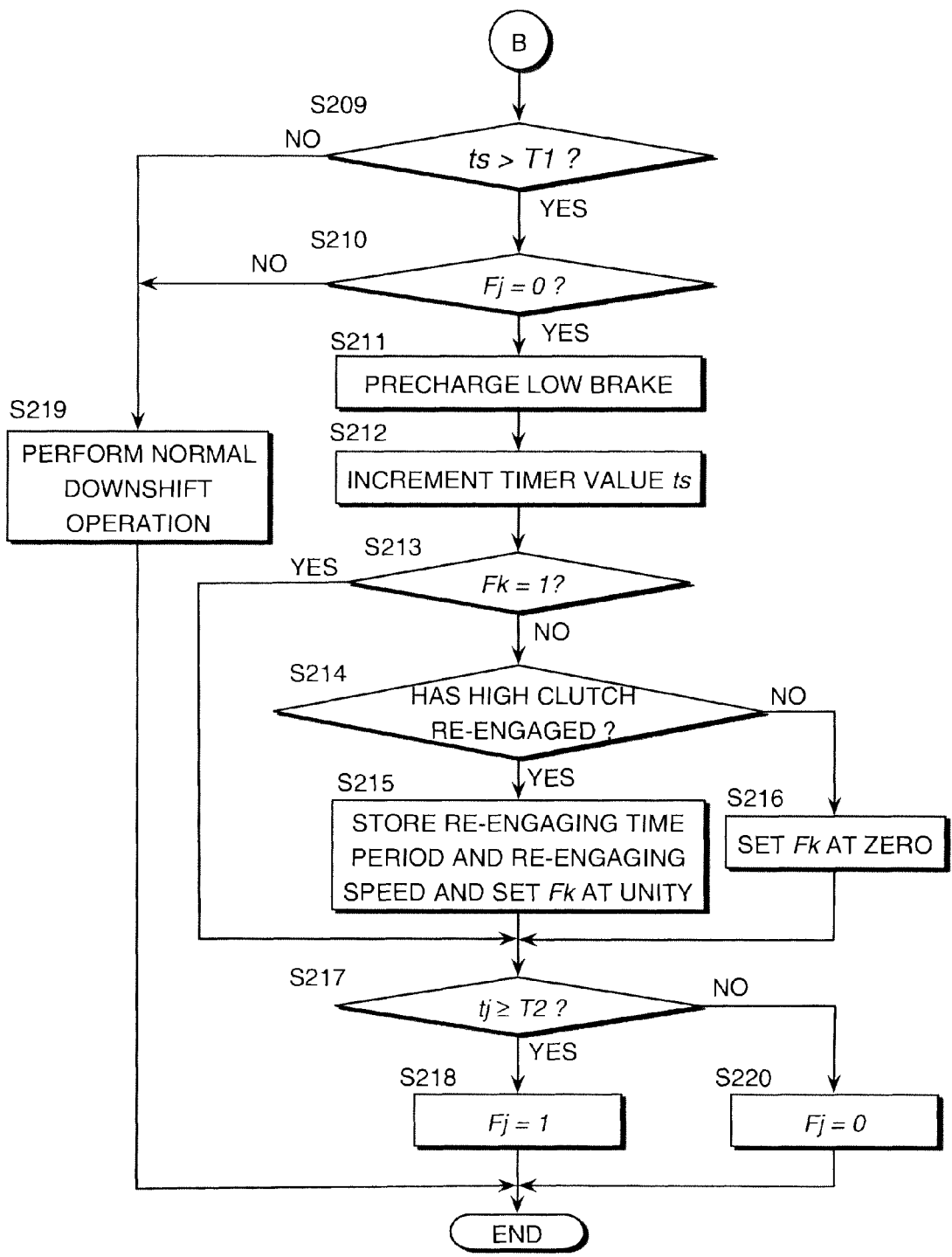

Upon determining through the shift determination routine that a downshift from the second speed to the first speed is to be executed, the transmission controller 12 repeatedly executes the downshift re-engaging time period/speed learning routine in FIGS. 16A and 16B over a predetermined time interval, e.g., 10 milliseconds.

Since the contents of the processing executed through this routine are substantially similar to those of the upshift re-engaging time period/speed learning routine in FIGS. 15A and 15B, the following explanation focuses on the features distinguishing this routine from the upshift re-engaging time period/speed learning routine.

In a step S201, the transmission controller 12 determines whether or not the continuously variable transmission 4 is currently in a loaded state. More specifically, the transmission controller 12 reads the throttle opening TVO and determines that the continuously variable transmission 4 is in a no-load state if the degree of throttle opening TVO is zero.

The processing in a step S202 and subsequent steps is executed only if it is determined in the step S201 that the continuously variable transmission 4 is in a no-load state. If it is determined that the continuously variable transmission 4 is not in the no-load state, the transmission controller 12 ends the routine.

In a step S203, the transmission controller 12 determines whether or not the downshift from the second speed to the first speed is to be executed on the basis of the vehicle speed VSP and throttle opening TVO. For example, when an operation point of the continuously variable transmission 4 moves from U to W across the mode switch line as shown in FIG. 3, it is determined that the downshift from the second speed to the first speed is to be executed. While the processing executed in steps S202-S218 is substantially identical to the processing executed in the steps S102-S118 in FIGS. 15A and 15B, the processing executed in the steps S202-S218 differs in that a minute slip is caused at the High clutch 33 by reducing the pressure of the oil supplied to the frictional engagement element 300 at the High clutch 33 and then, the minute slip at the High clutch 33 is terminated by increasing the pressure supplied to the frictional engagement element 300 at the Low brake 32. Through this process, the transmission controller 12 is able to measure the re-engaging time period and the re-engaging speed pertaining to the re-engagement of the frictional engagement element 300 at the High clutch 33.

The value for the re-engaging period and the re-engaging speed thus measured are used in the torque transmission start oil pressure/precharge oil pressure correction amount update routine in FIGS. 17A and 17B, which is executed following the completion of the downshift operation.

The torque transmission start oil pressure/precharge oil pressure correction amount update routine in FIGS. 17A and 17B is executed only once immediately after the completion of the upshift operation or the downshift operation at the subtransmission mechanism 30.

During the correction amount update routine, the transmission controller 12 executes the following control. Namely, in the routine executed following the re-engaging time period/speed learning routine in FIGS. 15A and 15B, the torque transmission start oil pressure correction amount and the precharge oil pressure correction amount for the frictional engagement element 300 at the High clutch 33 are updated based upon the re-engaging time period and the re-engaging speed having been measured through the routine executed as shown in FIGS. 15A and 15B, and the pressure of the oil supplied to the frictional engagement element 300 at the High clutch 33 during the next upshift operation is controlled based upon the update results. In the routine executed following the re-engaging time period/speed learning routine in FIGS. 16A and 16B, the torque transmission start oil pressure correction amount and the precharge oil pressure correction amount for the frictional engagement element 300 at the Low brake 32 are updated based upon the engaging time period and the engaging speed having been measured through the routine executed as shown in FIGS. 16A and 16B, and the pressure of the oil supplied to the frictional engagement element 300 at the Low brake 32 during the next downshift operation is controlled based upon the update results.

The following description is given by assuming that the torque transmission start oil pressure/precharge oil pressure correction amount update routine is executed following the routine executed as shown in FIGS. 15A and 15B, i.e., following the completion of an upshift operation. However, the contents of the processing executed in the torque transmission start oil pressure/precharge oil pressure correction amount update routine following the routine executed as shown in FIGS. 16A and 16B, i.e., following the completion of a downshift operation, are identical except that the target of the torque transmission start oil pressure and the precharge oil pressure is the Low brake 32 instead of the High clutch 33.

Referring to FIG. 17A, in a step S301, the transmission controller 12 determines whether or not an affirmative determination has been made in the step S109 through the immediately preceding execution of the re-engaging time period/speed learning routine in FIGS. 15A and 15B.

A negative determination made in the step S301 indicates that the re-engaging time period/speed have not been learned. In this case, the transmission controller 12 ends the routine without updating the torque transmission start oil pressure correction amount and the precharge oil pressure correction amount. It is assumed that the torque transmission start oil pressure correction amount and the precharge oil pressure correction amount are simply updated through this routine and that hydraulic control is executed based upon the update results through another routine. If the torque transmission start oil pressure correction amount and the precharge oil pressure correction amount are not updated through this routine, the oil pressure is controlled for the frictional engagement element 300 at the High clutch 33 based upon the pre-update correction values.

If an affirmative determination is made in the step S301, the transmission controller 12 determines in a step S302 whether or not the frictional engagement element 300 at the Low brake 32, having assumed a state of minute slippage, has become fully re-engaged during the preparatory phase. In more specific terms, a determination is made as to whether or not the step S116 has been executed in the upshift learning routine executed as shown in FIGS. 15A and 15B prior to the upshift operation at the subtransmission mechanism 30.

If the frictional engagement element 300 at the Low brake 32 to having been set in a state of minute slippage does not become fully re-engaged during the preparatory phase, there is bound to be significant variance in the real torque transmission start oil pressure and the actual precharge oil pressure at the frictional engagement element 300 in the High clutch 33. If it is determined in the step S302 that the frictional engagement element 300 at the Low brake 32, having been set in a state of minute slippage, has not become fully re-engaged during the preparatory phase, the transmission controller 12 proceeds to execute the processing in a step S313 and a step S314.

In the step S313, the transmission controller 12 increases, by a specific extent, the torque transmission start oil pressure correction amount for the frictional engagement element 300 at the High clutch 33 having been stored into the storage device 122 through a previous learning operation session. Likewise, in the step S314, the transmission controller 12 increases, by a specific extent, the precharge oil pressure correction amount for the frictional engagement element 300 at the High clutch 33 having been stored into the storage device 122 through a previous learning operation session. After increasing the precharge oil pressure correction amount in the step S314, the transmission controller 12 ends the routine.

If it is determined in the step S302 that the frictional engagement element 300 at the Low brake 32, having been set in a state of minute slippage, has become fully re-engaged during the preparatory phase, the transmission controller 12 proceeds to execute the processing in a step S303 and subsequent steps.

In the step S303, the transmission controller 12 determines whether or not a determination point defined in correspondence to the engaging time period and the engaging speed pertaining to the re-engagement of the frictional engagement element 300 at the Low brake assumes a position within an update prohibiting region on the torque transmission start oil pressure correction amount map stored in advance in the storage device 122, which takes on the characteristics indicated in FIG. 13.

The update prohibiting region, in which the re-engaging time period is short and the re-engaging speed is low, is equivalent to a situation that could not manifest under normal circumstances. An erroneous learning operation is prevented by prohibiting update of the correction amount over this region.

If an affirmative determination is made in the step S303, the transmission controller 12 proceeds to execute the processing in a step S308 without updating the torque transmission start oil pressure correction amount for the frictional engagement element 300 at the High clutch 33.

If a negative determination is made in the step S303, the transmission controller 12 determines in a step S304 whether or not the determination point takes up a position within a correction amount increasing region in the torque transmission start oil pressure correction amount map.

If an affirmative determination is made in the step S304, the transmission controller 12 increases by a specific extent the torque transmission start oil pressure correction amount for the frictional engagement element 300 at the High clutch 33 stored in the storage device 122 in a step S305. Upon executing the processing in the step S305, the transmission controller 12 proceeds to execute the processing in the step S308.

If a negative determination is made in the step S304, the transmission controller 12 determines in a step S306 whether or not the determination point takes up a position within a correction amount decreasing region in the torque transmission start oil pressure correction amount map.

If an affirmative determination is made in the step S306, the transmission controller 12 decreases by a specific extent the torque transmission start oil pressure correction amount for the frictional engagement element 300 at the High clutch 33 stored in the storage device 122 in a step S307. Upon executing the processing in the step S307, the transmission controller 12 proceeds to execute the processing in the step S308.

A negative determination made in the step S306 indicates that the determination point takes up a position that is not in the correction amount increasing region or the correction amount decreasing region in FIG. 13. In this case, the transmission controller 12 proceeds to execute the processing in the step S308 without updating the torque transmission start oil pressure correction amount for the frictional engagement element 300 at the High clutch 33.

In the step S308, the transmission controller 12 determines whether or not a determination point defined in correspondence to the engaging time period and the engaging speed pertaining to the re-engagement of the frictional engagement element 300 at the Low brake assumes a position within an update prohibiting region on the precharge oil pressure correction amount map stored in advance in the storage device 122, which takes on the characteristics indicated in FIG. 14.

If an affirmative determination is made in the step S308, the transmission controller 12 ends the routine without updating the precharge oil pressure correction amount for the frictional engagement element 300 at the High clutch 33.

If a negative determination is made in the step S308, the transmission controller 12 determines in a step S309 whether or not the determination point takes up a position within a correction amount increasing region in the precharge oil pressure correction amount map.

If an affirmative determination is made in the step S309, the transmission controller 12 increases by a specific extent the precharge oil pressure correction amount for the frictional engagement element 300 at the High clutch 33 stored in the storage device 122 in a step S310. Upon executing the processing in the step S310, the transmission controller 12 ends the routine.

If a negative determination is made in the step S309, the transmission controller 12 determines in a step S311 whether or not the determination point takes up a position within a correction amount decreasing region in the precharge oil pressure correction amount map.

If an affirmative determination is made in the step S311, the transmission controller 12 decreases by a specific extent the precharge oil pressure correction amount for the frictional engagement element 300 at the High clutch 33 stored in the storage device 122 in a step S312. Upon executing the processing in the step S312, the transmission controller 12 ends the routine.

A negative determination made in the step S311 indicates that the determination point takes up a position that is not in the correction amount increasing region or the correction amount decreasing region in FIG. 14. In this case, the transmission controller 12 ends the routine without updating the precharge oil pressure correction amount for the frictional engagement element 300 at the High clutch 33.

According to this invention described above, during an upshift operation executed while the continuously variable transmission 4 is under load, a minute slip is caused at the frictional engagement element 300 of the Low brake 32 and the torque transmission start oil pressure correction amount and the precharge oil pressure correction amount for the frictional engagement element 300 at the High clutch 33 are individually updated based upon the engaging time period and the engaging speed measured as the frictional engagement element 300 at the Low brake 32, having been set in a state of minute slippage, exits the state of minute slippage and becomes re-engaged while increasing the engaging pressure for the frictional engagement element 300 at the High clutch 33.

In addition, according to this invention, during a downshift operation executed while the continuously variable transmission 4 is in a no-load state, a minute slip is caused at the frictional engagement element 300 of the High clutch 33 and the torque transmission start oil pressure correction amount and the precharge oil pressure correction amount for the frictional engagement element 300 at the Low brake 32 are individually updated based upon the engaging time period and the engaging speed measured as the frictional engagement element 300 at the High clutch 33, having been set in a state of minute slippage, exits the state of minute slippage and becomes re-engaged while increasing the engaging pressure for the frictional engagement element 300 at the Low brake 32.

Through these measures, the torque transmission start oil pressures for the Low brake 32 and the High clutch 33 can be controlled with a high level of accuracy.

Furthermore, since the stroke of the cylinder 303 in the frictional engagement element 300 shown in FIG. 5 is completed within a predetermined length of time without inducing an oil pressure overshoot, the precharge oil pressures for the High clutch 33 and the Low brake 32 can be controlled with a high level of accuracy By controlling the torque transmission start oil pressures and the precharge oil pressures accurately, better shift quality can be assured during vehicle operation.

In addition, if the re-engaging speed and the re-engaging time period measured as the frictional engagement element 300 at the High clutch 33, having been set in a state of minute slippage, becomes re-engaged, are respectively lower than a predetermined speed and less than a predetermined value, the torque transmission start oil pressure correction value and the precharge oil pressure correction value for the frictional engagement element 300 at the Low brake 32 are not updated and thus, an erroneous learning operation is not executed.

Likewise, if the re-engaging speed and the re-engaging time period measured as the frictional engagement element 300 at the Low brake 32, having been set in a state of minute slippage, becomes re-engaged, are respectively lower than a predetermined speed and less than a predetermined value, the torque transmission start oil pressure correction value and the precharge oil pressure correction value for the frictional engagement element 300 at the High clutch 33 are not updated and thus, an erroneous learning operation is not executed.

It is to be noted that during an upshift operation at the subtransmission mechanism 30 executed while the continuously variable transmission 4 is under load, the transmission controller 12 may assume a predetermined shift start throttle opening TVO set in correspondence to each vehicle speed VSP. In such a case, a minute slip should be induced at a time point at which the vehicle speed becomes equal to a value that is lower by a specific extent than the shift start vehicle speed corresponding to a specific shift start throttle opening TVO. Subsequently, if the transmission controller 12 determines that a shift operation is to start at the subtransmission mechanism 30 and a state of minute slippage to a predetermined extent has been sustained at the frictional engagement element 300 of the Low brake 32 (or the High clutch 33) at the shift start, the engaging time period and the engaging speed should be learned.

As an alternative, a minute slip may be induced at the frictional engagement element 300 of the Low brake 32 (or the High clutch 33) at a stage preceding the shift determination step and upon determining that the state of minute slippage has been sustained at a predetermined rotation speed over a predetermined length of time, the preparatory phase may be started for the High clutch 33 (or the Low brake 32) to learn the engaging time period and the engaging speed.

The determination as to whether or not the state of minute slippage has been cleared may be made through any one of various methods. For instance, the state of minute slippage may be determined to have been cleared when the difference relative to the rotation speed measured prior to the shift start with the frictional engagement element 300 in an engaged state is equal to or less than a predetermined value, i.e., when the actual extent of the slippage becomes equal to or less than a predetermined value.

Since the state of such minute slippage can be cleared instantly, the state of the slippage may be determined to have been cleared as soon as the extent of the slippage starts to decrease.

The contents of Tokugan 2009-169187, with a filing date of Jul. 17, 2009 in Japan, and Tokugan 2010-157222, with a filing date of Jul. 9, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, the engaging time period and the engaging speed are both learned as the engaging state variation value of the first or second frictional engagement element. Although learning both of the engaging time period and the engaging speed is preferable in terms of ensuring a high degree of control precision, this invention can be implemented by learning only one of the engaging time period and the engaging speed. Further, it is also possible to learn a parameter other than the engaging time period and the engaging speed as long as it represents the engaging state variation value of the first or second frictional engagement element.

The embodiments of this invention in which an exclusive property or privilege is claimed are defined as follows:

What is claimed is:

1. A control device for an automatic transmission for a vehicle, the transmission comprising a transmission mechanism that comprises a first frictional engagement element and a second frictional engagement element and is engaged in a shift operation between a first state in which the first frictional engagement element is disengaged and the second frictional engagement element is engaged and a second state in which the first frictional engagement element is engaged and the second frictional engagement element is disengaged, the transmission mechanism having a characteristic that a minute slip is caused to occur at the second frictional engagement element by loosening engagement of the second frictional engagement element in the first state, and the minute slip is terminated as the first frictional engagement element is engaged, the device comprising:
a programmable controller programmed to:
perform a determination as to whether or not a shifting operation from the first state to the second state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order;
when the determination is affirmative, control the transmission mechanism to cause a minute slip at the second frictional engagement element by loosening engagement of the second frictional engagement element in the first state, terminate the minute slip at the second frictional engagement element by gradually engaging the first frictional engagement element, learn a value representing an engaging state variation in the first frictional engagement element between a time point at which engagement of the first frictional engagement element starts and a time point at which the minute slip of the second frictional engagement element is terminated; and
correct an engaging force with which the first frictional engagement element is engaged in a shift operation executed to shift from the first state to the second state based upon the value representing the engaging state variation having been learned.

2. The control device as defined in claim 1, wherein the value representing the engaging state variation is an engaging time period of the first frictional engagement element or an engaging speed of the first frictional engagement element or both.

3. The control device as defined in claim 2, wherein the value representing the engaging state variation is an engaging time period of the first frictional engagement element and an engaging speed of the first frictional engagement element;

the first frictional engagement element is structured so that the engaging force thereat is adjusted in correspondence to an oil pressure of oil supplied thereto;
the engaging force at the first frictional engagement element is controlled during the shift operation executed to shift from the first state to the second state based upon a precharge oil pressure applied for purposes of preparing the first frictional engagement element for operation and a torque transmission start oil pressure at which torque transmission at the first frictional engagement element starts; and
the controller is further programmed to:
increase correct the precharge oil pressure as the engaging time period is longer and the engaging speed is higher, and
increase correct the torque transmission start oil pressure as the engaging time period is longer and the engaging speed is lower.

4. The control device as defined in claim 3, wherein:
the shift operation executed to shift from the first state to the second state includes a preparatory phase during which an oil pressure of oil supplied to the first frictional engagement element is raised to a preliminary oil pressure required to start the torque phase; and
the precharge oil pressure is an oil pressure temporarily supplied at a start of the preparatory phase and the torque transmission start oil pressure is an oil pressure assumed at a start of the torque phase.

5. The control device as defined in claim 4, further comprising a sensor that detects a vehicle operating condition, wherein the controller is further programmed to;
perform the determination based upon the vehicle operating condition; and
cause a minute slip at the second frictional engagement element by loosening engagement of the second frictional engagement element in the first state prior to the start of the preparatory phase;
control the transmission mechanism to terminate the minute slip of the second frictional engagement element by gradually engaging the first frictional engagement element during the preparatory phase; and
learn the engaging time period and the engaging speed of the first frictional engagement element between the start of engagement of the first frictional engagement element and termination of the minute slip of the second frictional engagement element.

6. The control device as defined in claim 5, wherein the vehicle comprises an internal combustion engine that inputs a rotation to the automatic transmission, and the sensor comprises a sensor that detects a load on the internal combustion engine and a sensor that detects a vehicle speed.

7. The control device as defined in claim 5, wherein the controller is further programmed to:
increase the precharge oil pressure and the torque transmission start oil pressure to be applied to the first frictional engagement element in the shift operation from the first state to the second state when the minute slip of the second frictional engagement element is not terminated during the preparatory phase.

8. The control device as defined in claim 3, wherein the controller is further programmed to:
select, based upon the engaging time period and the engaging time speed having been learned, one of;
a first option in which the engaging force at the first frictional engagement element is increased for the shift operation from the first state to the second state;

a second option in which the engaging force at the first frictional engagement element is decreased for the shift operation from the first state to the second state; and a third option in which the engaging force at the first frictional engagement element is not corrected for the shift operation from the first state to the second state.

9. The control device as defined in claim 1, wherein the transmission mechanism has a characteristic that a minute slip is caused to occur at the first frictional engagement element by loosening engagement of the first frictional engagement element in the second state, and the minute slip at the first frictional engagement element is terminated as the second frictional engagement element is engaged, and the controller is further programmed to:

perform a second determination as to whether or not a shifting operation from the second state to the first state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order;

when the second determination is affirmative, control the transmission mechanism to cause a minute slip at the first frictional engagement element by loosening engagement of the first frictional engagement element in the second state;

terminate the minute slip at the first frictional engagement element by gradually engaging the second frictional engagement element;

learn a value representing an engaging state variation in the second frictional engagement element between a time point at which engagement of the second frictional engagement element starts and a time point at which the minute slip of the first frictional engagement element is terminated; and correct an engaging force with which the second frictional engagement element is engaged in a shift operation executed to shift from the second state to the first state based upon the value representing an engaging state variation in the second frictional engagement element having been learned.

10. The control device as defined in claim 1, wherein the automatic transmission comprises a continuously variable transmission mechanism to which the transmission mechanism is connected in series, and the transmission mechanism comprises:

a Ravigneaux planetary gear mechanism comprising a combination of gears made up with a front sun gear, a rear sun gear, a plurality of short pinions, a plurality of long pinions and a ring gear, and a carrier 31C which supports the long pinions and the short pinions;

a Low brake that operates as the first frictional engagement element to disallow rotation of the front sun gear; and a High clutch that operates as the second frictional engagement element to couple the ring gear with the carrier.

11. A control device for an automatic transmission for a vehicle, the transmission comprising a transmission mechanism that comprises a first frictional engagement element and a second frictional engagement element and is engaged in a shift operation between a first state in which the first frictional engagement element is disengaged and the second frictional engagement element is engaged and a second state in which the first frictional engagement element is engaged and the second frictional engagement element is disengaged, the transmission mechanism having a characteristic that a minute slip is caused to occur at the second frictional engagement element by loosening engagement of the second frictional engagement element in the first state, and the minute slip is terminated as the first frictional engagement element is engaged, the device comprising:

means for performing a determination as to whether or not a shifting operation between the first state and the second state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order;

means for controlling the transmission mechanism, when the determination is affirmative, to cause a minute slip at the second frictional engagement element by loosening engagement of the second frictional engagement element in the first state;

means for terminating the minute slip at the second frictional engagement element by gradually engaging the first frictional engagement element;

means for learning a value representing an engaging state variation in the first frictional engagement element between a time point at which engagement of the first frictional engagement element starts and a time point at which the minute slip of the second frictional engagement element is terminated; and means for correcting an engaging force with which the first frictional engagement element is engaged in a shift operation executed to shift from the first state to the second state based upon the value representing the engaging state variation having been learned.

12. A control method for an automatic transmission for a vehicle, the transmission comprising a transmission mechanism that comprises a first frictional engagement element and a second frictional engagement element and is engaged in a shift operation between a first state in which the first frictional engagement element is disengaged and the second frictional engagement element is engaged and a second state in which the first frictional engagement element is engaged and the second frictional engagement element is disengaged, the transmission mechanism having a characteristic that a minute slip is caused to occur at the second frictional engagement element by loosening engagement of the second frictional engagement element in the first state, and the minute slip is terminated as the first frictional engagement element is engaged, the method comprising:

performing a determination as to whether or not a shifting operation between the first state and the second state is to be performed in such a way that a torque phase in which engaging pressures of the first frictional engagement element and the second frictional engagement element are varied without varying a speed ratio of the transmission mechanism and an inertia phase in which speed ratio of the transmission mechanism is actually varied are performed in this order;

controlling the transmission mechanism, when the determination is affirmative, to cause a minute slip at the second frictional engagement element by loosening engagement of the second frictional engagement element in the first state;

terminating the minute slip at the second frictional engagement element by gradually engaging the first frictional engagement element;

learning a value representing an engaging state variation in the first frictional engagement element between a time point at which engagement of the first frictional engagement element starts and a time point at which the minute slip of the second frictional engagement element is terminated; and correcting an engaging force with which the first frictional engagement element is engaged in a shift operation executed to shift from the first state to the second state based upon the value representing the engaging state variation having been learned.

* * * * *